United States Patent
Tippy et al.

(10) Patent No.: US 10,926,663 B2
(45) Date of Patent: Feb. 23, 2021

(54) RESTRAINT MONITORING SYSTEM FOR A VEHICLE

(71) Applicant: Ford Global Technologies, LLC, Dearborn, MI (US)

(72) Inventors: David James Tippy, Ann Arbor, MI (US); James Martin Lawlis, Grosse Pointe Farms, MI (US); Alan George Dry, Grosse Pointe Woods, MI (US); Galen Keith Thomas, Dearborn, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 16/511,314

(22) Filed: Jul. 15, 2019

(65) Prior Publication Data
US 2021/0016681 A1    Jan. 21, 2021

(51) Int. Cl.
| | |
|---|---|
| *B60N 2/00* | (2006.01) |
| *B60P 7/08* | (2006.01) |
| *B60N 2/015* | (2006.01) |
| *H04L 12/40* | (2006.01) |
| *B60N 2/01* | (2006.01) |
| *B60R 16/03* | (2006.01) |

(52) U.S. Cl.
CPC ........... *B60N 2/002* (2013.01); *B60N 2/0155* (2013.01); *B60P 7/0815* (2013.01); *H04L 12/40* (2013.01); *B60N 2/01* (2013.01); *B60R 16/03* (2013.01); *H04L 2012/40215* (2013.01); *H04L 2012/40273* (2013.01)

(58) Field of Classification Search
CPC .. B60R 2021/01006; B60N 2002/0264; B60N 2/002; B60N 2/0725; B64D 11/06; B64D 11/0624
See application file for complete search history.

(56) References Cited

U.S. PATENT DOCUMENTS

| | | | |
|---|---|---|---|
| 5,802,479 A | 9/1998 | Kithil et al. | |
| 6,186,539 B1 | 2/2001 | Foo et al. | |
| 6,274,948 B1 | 8/2001 | Blank et al. | |
| 9,963,236 B2 | 5/2018 | Silva et al. | |
| 2003/0214308 A1* | 11/2003 | Condron | ............. B60R 21/0173 |
| | | | 324/549 |
| 2006/0025897 A1* | 2/2006 | Shostak | ................. G08G 1/017 |
| | | | 701/1 |
| 2007/0075919 A1* | 4/2007 | Breed | ............... B60R 21/01516 |
| | | | 345/8 |

* cited by examiner

*Primary Examiner* — Omeed Alizada
(74) *Attorney, Agent, or Firm* — David Coppiellie; Price Heneveld LLP

(57) ABSTRACT

A vehicle includes a rail-mounted component. The rail-mounted component can be equipped with one or more restraints. A restraint monitoring system monitors the one or more restraints. The restraint monitoring system includes a restraint control module and a rail-mounted component control module. The rail-mounted component control module can include a restraint deployment loop and a restraint diagnostic loop for relaying restraint deployment signals and restraint diagnostic signals, respectively, between the restraint control module and the rail-mounted component control module.

19 Claims, 23 Drawing Sheets

FIG. 17

RESTRAINT MONITORING SYSTEM FOR A VEHICLE

FIELD OF THE DISCLOSURE

The present disclosure generally relates to a restraint monitoring system. More specifically, the present disclosure relates to a restraint monitoring system for a vehicle.

BACKGROUND OF THE INVENTION

With the emergence of autonomous and semi-autonomous vehicles, communication networks within vehicles are becoming more complex. The increased complexity of the communication networks within the vehicles can also lead to increased communication traffic along those communication networks. Due to the increased complexity of the communication networks and the increased communication traffic, additional solutions are need for monitoring high-priority components of the vehicle (e.g., restraints).

SUMMARY OF THE INVENTION

According to a first aspect of the present disclosure, a vehicle includes a rail-mounted component. The rail-mounted component can be equipped with one or more restraints. A restraint monitoring system includes a restraint control module and a rail-mounted component control module. The rail-mounted component control module can include a restraint deployment loop and a restraint diagnostic loop.

Embodiments of the first aspect of the present disclosure can include any one or a combination of the following features:
- the restraint monitoring system can further include a vehicle interface module;
- the vehicle interface module includes a vehicle interface module microcontroller,
- the vehicle interface module microcontroller communicates data signals between the rail-mounted component and the vehicle;
- the data signals communicated between the rail-mounted component and the vehicle are at least one of rail-mounted component position within the vehicle, inventory of monitored components provided on the rail-mounted component, and status of the monitored components provided on the rail-mounted component;
- the vehicle interface module includes a regulator module;
- the regulator module is coupled to a vehicle-mounted power supply and a rail assembly of the vehicle;
- the regulator module limits at least one of a voltage and a current that is supplied to the rail assembly by the vehicle-mounted power supply;
- a rail assembly that receives the rail-mounted component such that the rail-mounted component is slidably coupled with the rail assembly;
- a high-speed communication network embedded within the rail assembly;
- the high-speed communication network is dedicated to communications between the restraint control module and the rail-mounted component control module;
- the high-speed communication network is a high-speed CAN bus;
- the high-speed communication network is isolated from other communication networks within the vehicle;
- the restraint control module communicates a restraint deployment signal directly to the rail assembly;
- the restraint deployment signal is transmitted from the rail assembly to the rail-mounted component control module by way of a high-speed communication network;
- the restraint deployment signal is received by a rail-mounted component control module microcontroller located on the rail-mounted component;
- the rail-mounted component control module microcontroller references an occupancy sensor to determine if the rail-mounted component is occupied; and
- upon determination by the rail-mounted component control module microcontroller that the rail-mounted component is occupied and the restraint deployment signal has been received, the rail-mounted component control module microcontroller communicates the restraint deployment signal to the one or more restraints.

According to a second aspect of the present disclosure, a vehicle includes a rail-mounted component, a rail assembly, a high-speed communication network, and a restraint monitoring system. The rail-mounted component can be equipped with one or more restraints. The rail assembly receives the rail-mounted component such that the rail-mounted component is slidably coupled with the rail assembly. The restraint monitoring system includes a restraint control module and a rail-mounted component control module. The rail-mounted component control module includes a restraint deployment loop and a restraint diagnostic loop. The high-speed communication network is dedicated to communications between the restraint control module and the rail-mounted component control module. The high-speed communication network is isolated from other communication networks within the vehicle. The restraint control module communicates a restraint deployment signal directly to the rail assembly. The restraint deployment signal is transmitted from the rail assembly to the rail-mounted component control module by way of the high-speed communication network. The restraint deployment signal is received by a rail-mounted component control module microcontroller located on the rail-mounted component. The rail-mounted component control module microcontroller references an occupancy sensor to determine if the rail-mounted component is occupied. Upon determination by the rail-mounted component control module microcontroller that the rail-mounted component is occupied and the restraint deployment signal has been received, the rail-mounted component control module microcontroller communicates the restraint deployment signal to the one or more restraints.

Embodiments of the second aspect of the present disclosure can include any one or a combination of the following features:
- the high-speed communication network is embedded within the rail assembly.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 17 is an expanded view of the track assembly, taken at section XVII of FIG. 12, illustrating the engagement between conductive members and brushes, according to one example;

DETAILED DESCRIPTION OF THE PREFERRED EMBODIMENTS

Figure 1:
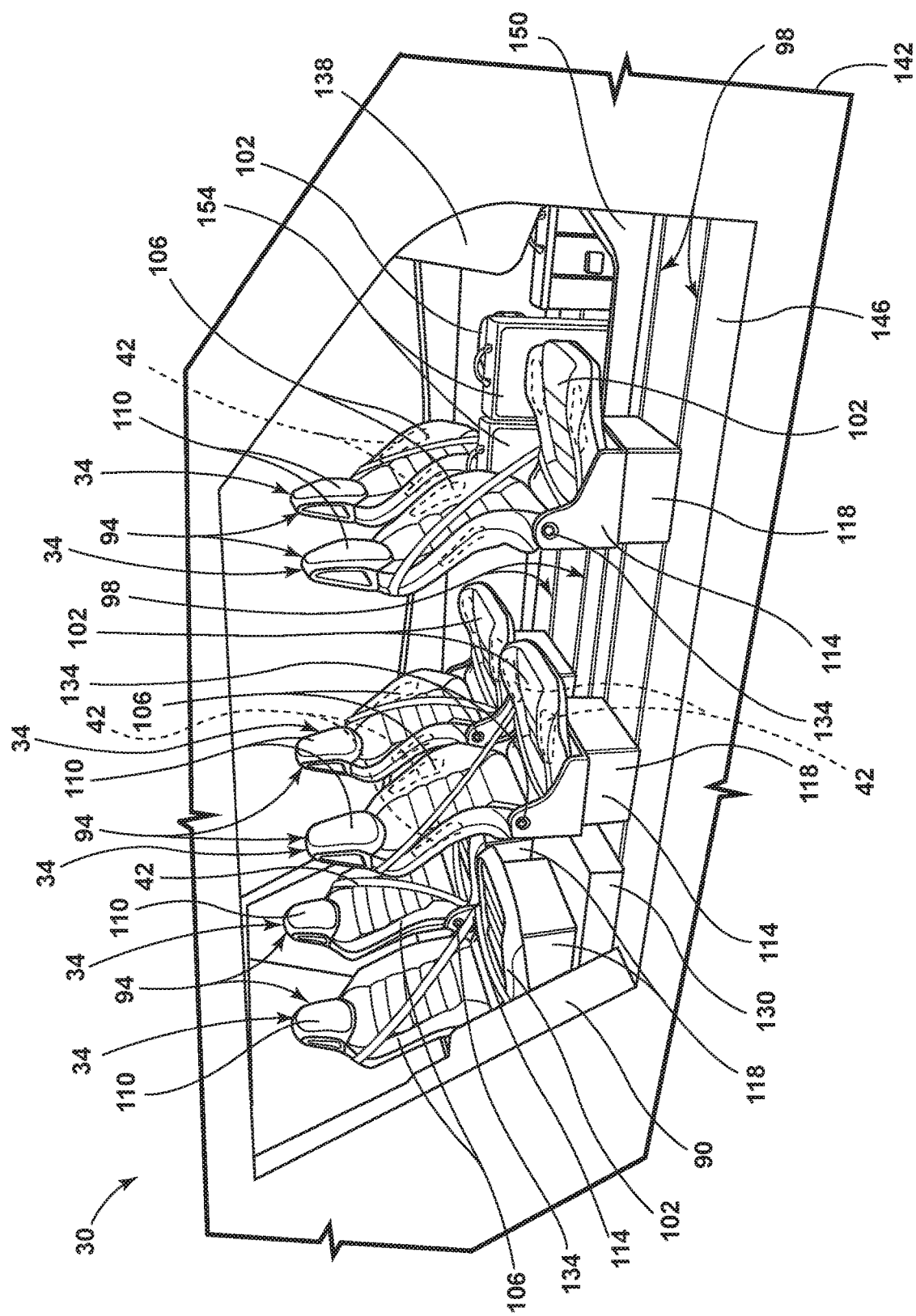
FIG. 1 is a side perspective view of a cabin of a vehicle, illustrating a configuration of seating assemblies, according to one example.
Figure 7:
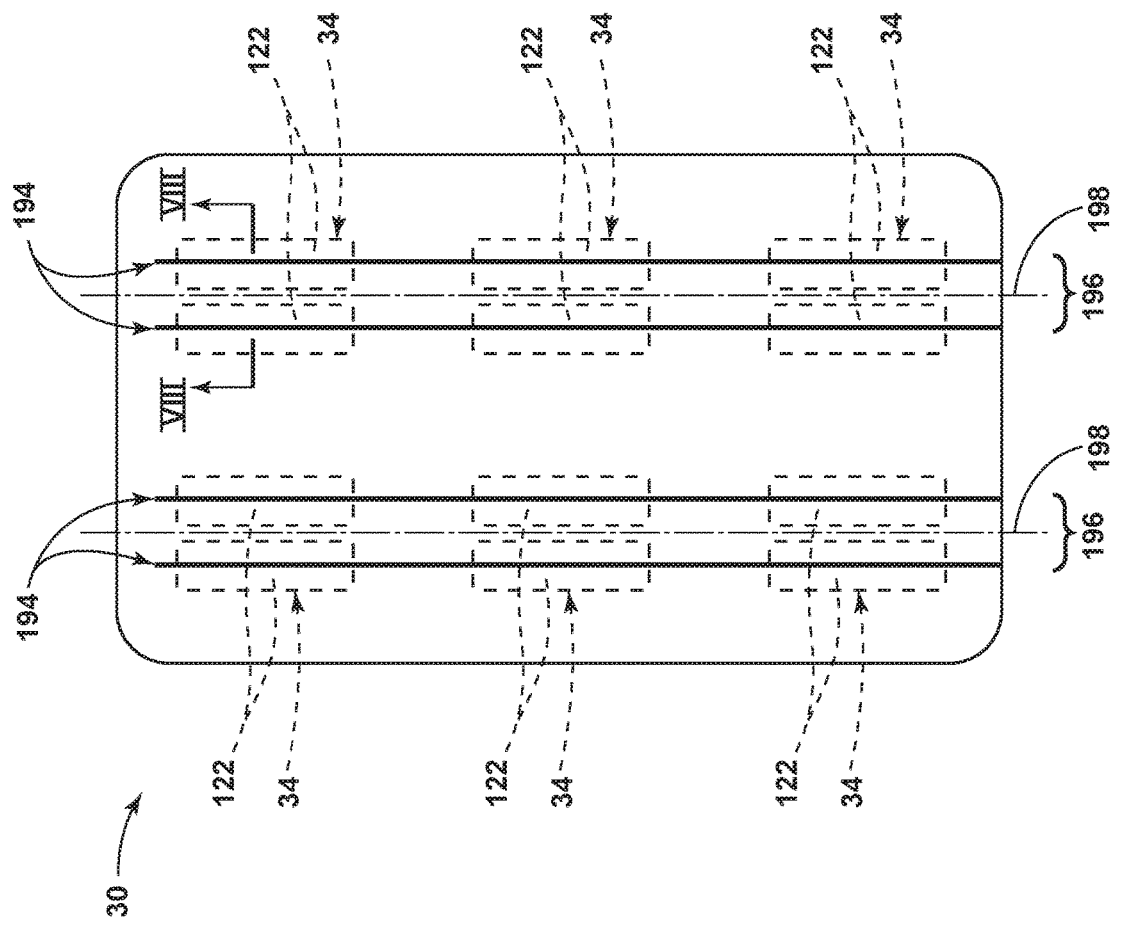
FIG. 7 is a top view of the cabin of the vehicle, illustrating track assemblies that the rail-mounted components couple to, according to one example.
Figure 8:
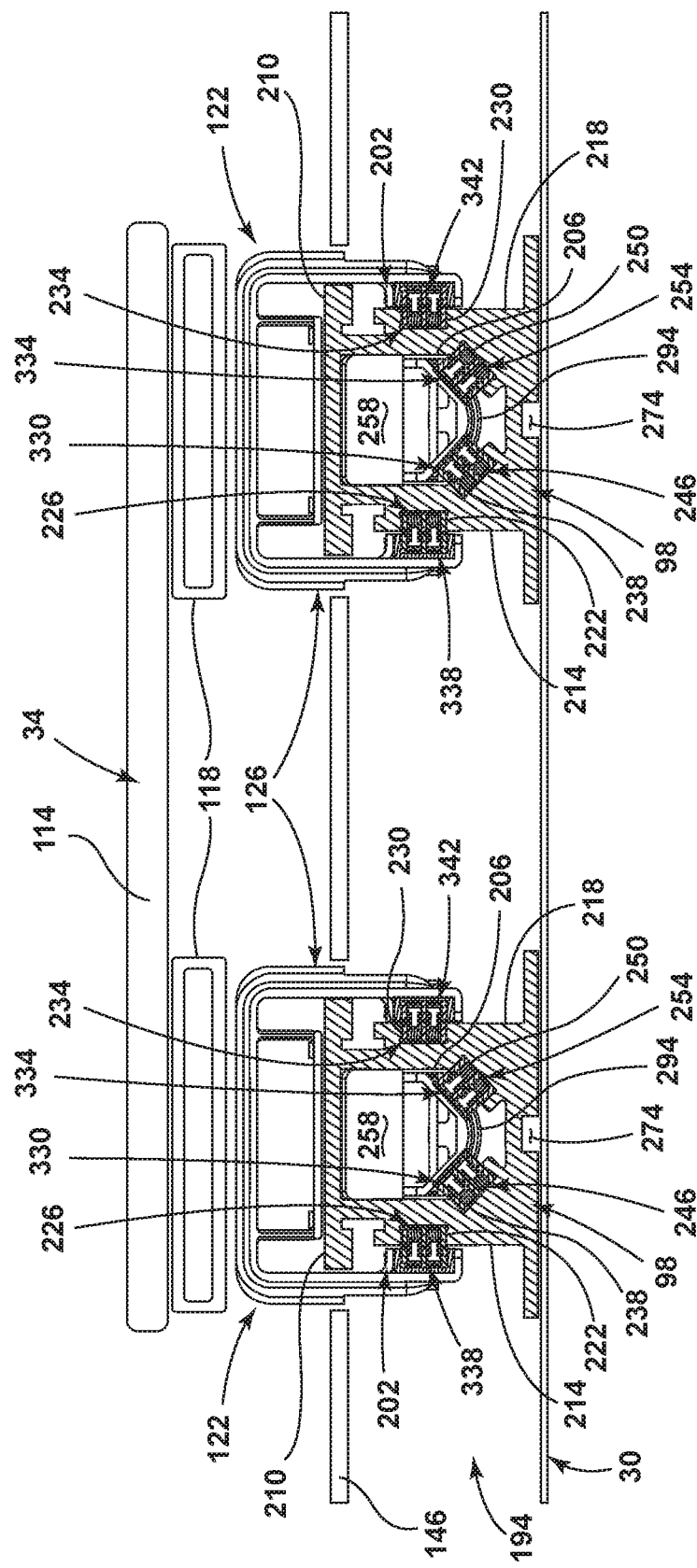
FIG. 8 is a cross-sectional view of the cabin of the vehicle, taken along line VIII-VIII of FIG. 7, illustrating various components of the track assembly and the vehicle, according to one example.
Figure 9:
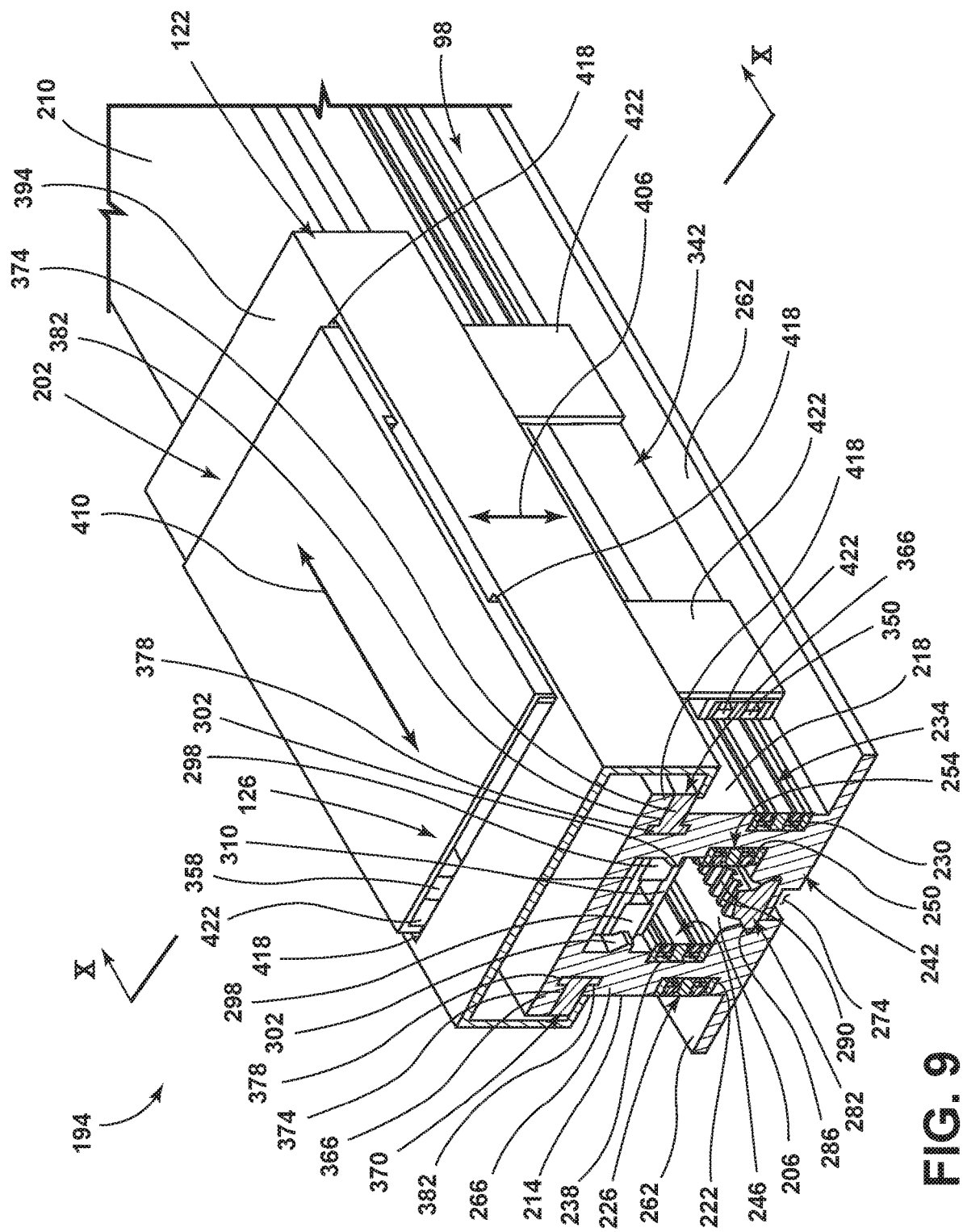
FIG. 9 is a side perspective view of the track assembly, illustrating various components of the track assembly, according to one example.

For purposes of description herein, the terms "upper," "lower," "right," "left," "rear," "front," "vertical," "horizontal," and derivatives thereof shall relate to the concepts as oriented in FIG. 1 and/or FIG. 7. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a restraint monitoring system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-23, reference numeral 30 generally designates a vehicle. The vehicle 30 may be a motor vehicle, a land vehicle, an air vehicle, and/or a water vehicle. The vehicle 30 includes one or more rail-mounted components 34 and a restraint monitoring system 38. One or more of the one or more rail-mounted components 34 can be provided with one or more restraints 42. In various examples, the restraints 42 can be seatbelts, airbags, tethers, or any other structure that restricts movement of a cargo item or a passenger. The restraint monitoring system 38 can include a restraint control module 46, a vehicle interface module 50, and a rail-mounted component control module 54. In various examples, the vehicle interface module 50 may be omitted, as will be discussed in further detail herein. The vehicle interface module 50 can include a regulator module 58, a vehicle interface module microcontroller 62, and a peripheral sensor interface 66 (e.g., PSI5). In various examples, the restraint control module 46 can receive communication of a diagnostic issue from the rail-mounted component control module 54. In turn, the restraint control module 46 can relay the diagnostic issue to a user of the vehicle 30. The rail-mounted component control module 54 can include a restraint deployment loop 74 and a restraint diagnostic loop 78.

Figure 2:
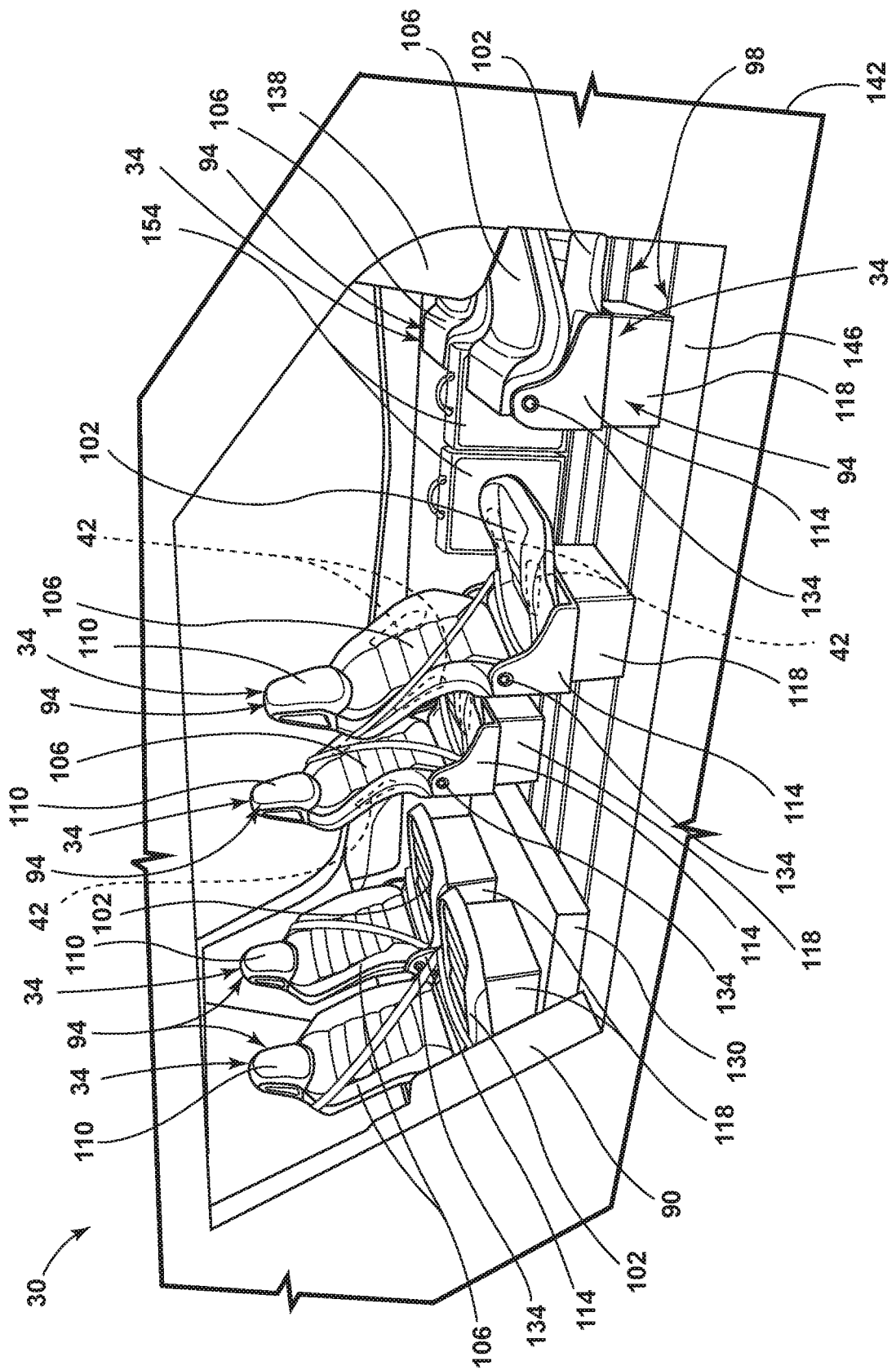
FIG. 2 is a side perspective view of the cabin of the vehicle, illustrating a configuration of the seating assemblies, according to another example.
Figure 3:
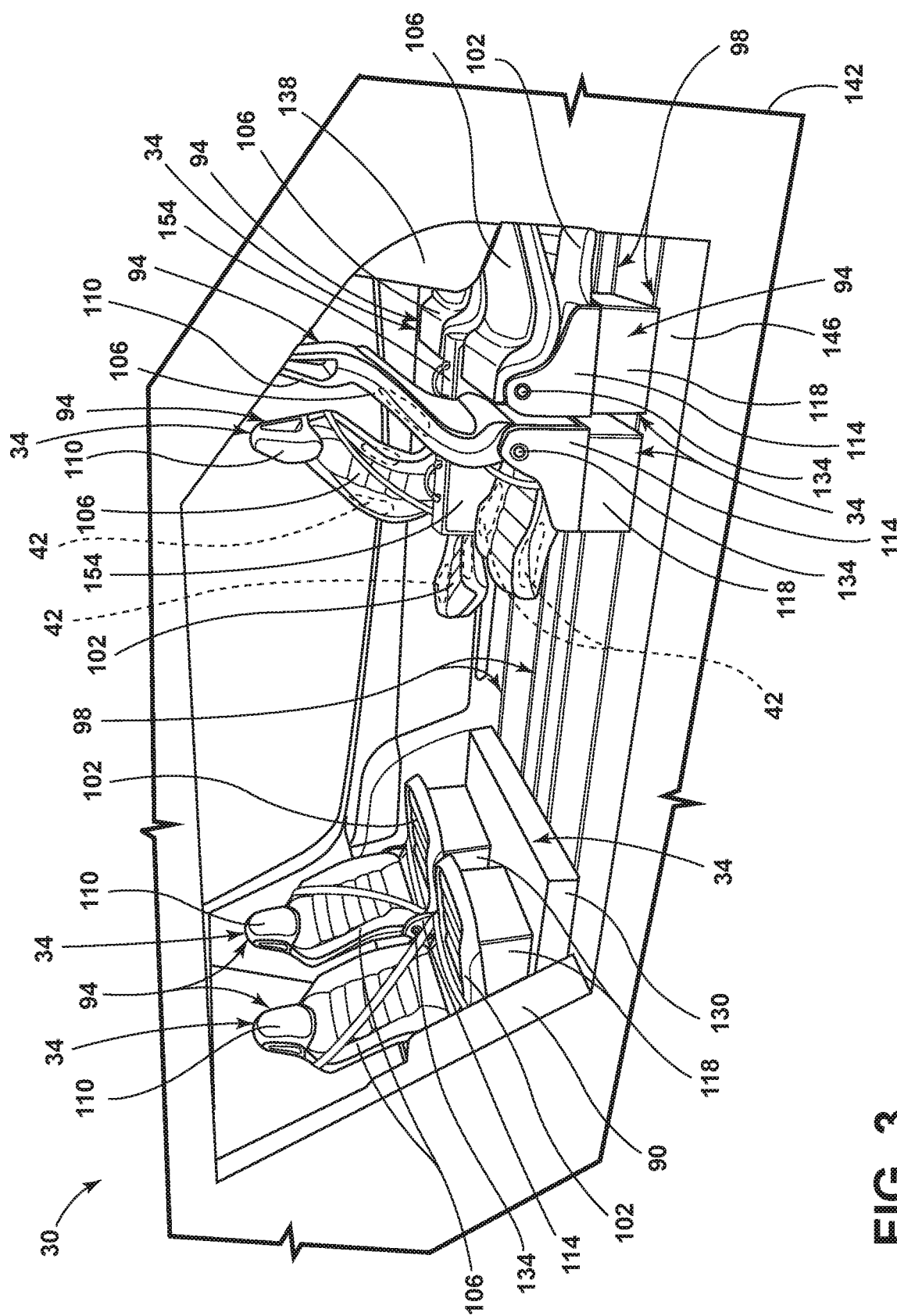
FIG. 3 is a side perspective view of the cabin of the vehicle, illustrating a configuration of the seating assemblies, according to one example.

Referring again to FIGS. 1-3, a cabin 90 of the vehicle 30 can be provided with one or more seating assemblies 94. The seating assemblies 94 can be positioned at various locations along rail assemblies 98 within the cabin 90. The seating assemblies 94 are provided with a seat 102, a seatback 106, and/or a headrest 110. In some examples, the seat 102 and the seatback 106 can be pivotably coupled to one another by way of a carrier 114. In some examples, the carrier 114 may be directly coupled to the rail assemblies 98 (e.g., by anchors). Alternatively, in various examples, the carrier 114 may be coupled to the rail assemblies 98 indirectly (e.g., by a carriage portion 118). The carriage portion 118 can be a housing for a carriage assembly 122 (see FIG. 10). In various examples, the carriage assembly 122 can be coupled to the carriage portion 118 by a carriage structure 126. In some examples, the seating assemblies 94 that are positioned at a rearward most location within the cabin 90 may be provided with an additional platform 130 that is directly coupled to either the carrier 114 or the carriage portion 118. The platform 130 can provide the rearward most seating assemblies 94 with additional vertical height relative to the remaining seating assemblies 94 to allow occupants of the rearward most seating assemblies 94 a better vantage point and more interesting view than if the seating assemblies 94 were all at about the same height. The platform 130, in some examples, may couple a plurality of the seating assemblies 94 together. For example, the platform 130 may provide a common riser or dais between two adjacent seating assemblies 94. The seating assemblies 94 can be positioned in a conventional first row, second row, and/or third row configuration as shown in FIG. 1. Alternatively, the seating assemblies 94 can be positioned in an unconventional manner, such as the configurations shown in FIGS. 2 and 3. For example, one or more of the seating assemblies 94 may be placed in a stored position, such as those pictured in a forward most row in FIGS. 2 and 3. When in the stored position, the seating assemblies 94 may be stored in a number of positions and/or locations. For example, the seating assemblies 94 may be forward-dumped such that the seatback 106 is generally horizontal and generally parallel with the seat 102 by pivoting the seatback 106 forward about a pivot point 134 of the carrier 114. When in the stored position, the seating assemblies 94 may be stored beneath a forward console 138 that is positioned proximate a front 142 of the vehicle 30. The seating assemblies 94 may be provided with a swivel functionality that allows the seating assemblies 94 to pivot about a vertical axis relative to a floor 146 of the vehicle 30. For example, the carrier 114 may be coupled to the floor 146 by a swivel assembly that permits pivotable motion of the seating assembly 94 about a vertical axis while maintaining engagement of the seating assembly 94 with the rail assemblies 98. In some examples, where the carriage portion 118 is employed, the carrier 114 and the carriage portion 118 may be coupled to one another in a manner that permits the pivotable motion of the seating assembly 94 about the vertical axis while maintaining the engagement of the seating assembly 94 with the rail assemblies 98. For example, the carriage portion 118 may remain coupled to one or more of the rail assemblies 98 and rotationally stationary relative to the rail assemblies 98 while the carrier 114 and the seating assembly 94 pivot or rotate about the vertical axis relative to the rail assemblies 98. In examples where the platform 130 is employed, the platform 130 may remain coupled to the rail assemblies 98 and rotationally stationary relative to the rail assemblies 98 while the seating assembly 94, the carrier 114, and/or the carriage portion 118 are capable of pivoting or rotating about the vertical axis relative to the rail assemblies 98. In various examples, a central console 150 may be provided in a location between at least some of the seating assemblies 94 that are laterally adjacent to one another. The central console 150 may generally extend along a longitudinal axis, or travel axis, of the vehicle 30. The central console 150 can be provided with a number of functionalities, such as storing of cargo items 154 (e.g., luggage), providing electrical connections for electrical devices, providing data connections for interaction with the vehicle 30, and/or other convenience and comfort functionalities. The configurations illustrated in FIGS. 1-3 may be referred to as passenger arrangements where the vehicle 30 is primarily being used to transport passengers and their accompanying cargo items. The configurations illustrated in FIGS. 1-3 are exemplary in nature and are not intended to limit the scope of the present disclosure.

Figure 4:
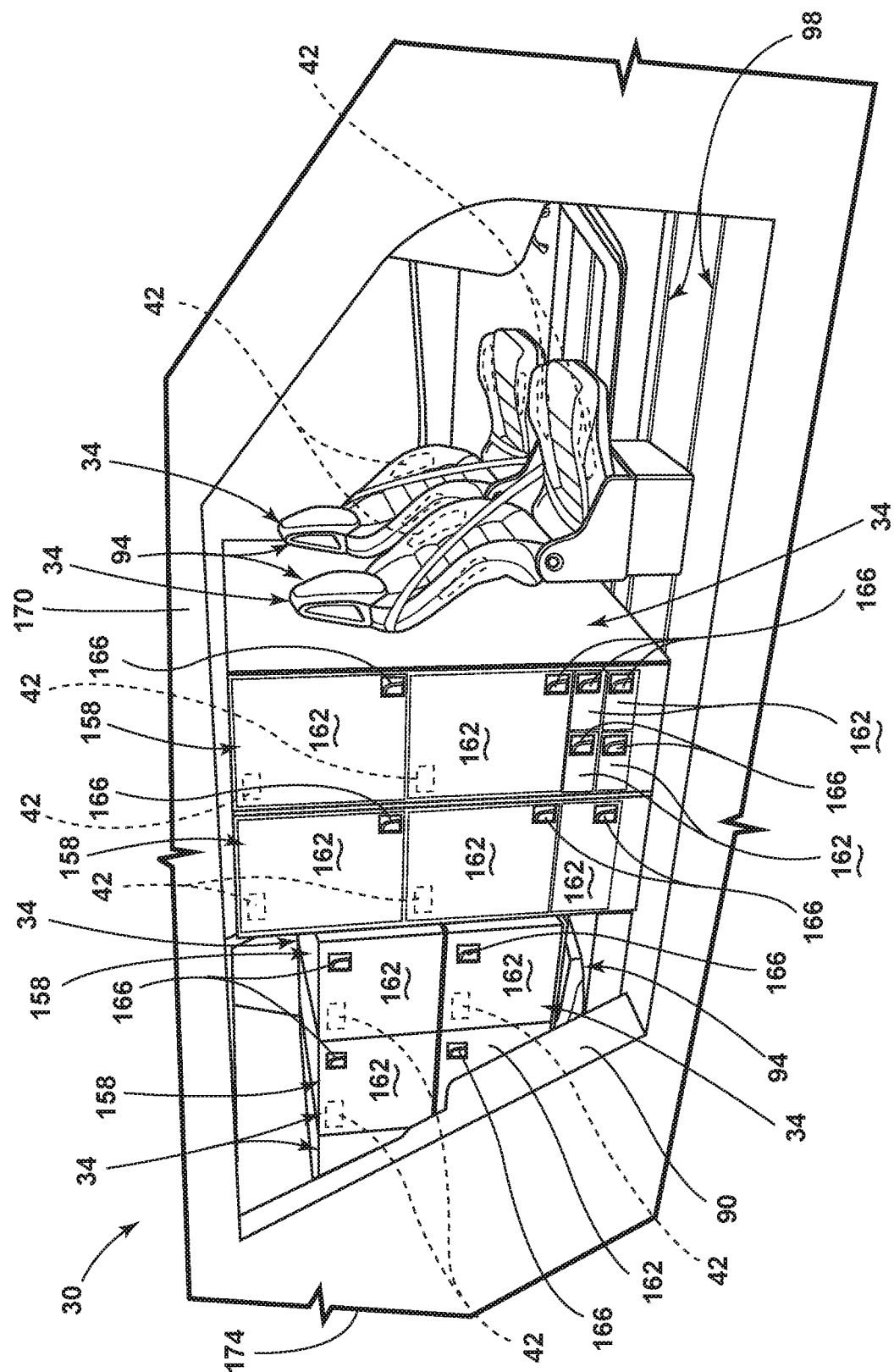
FIG. 4 is a side perspective view of the cabin of the vehicle, illustrating a configuration of the seating assemblies and storage units, according to one example.
Figure 5:
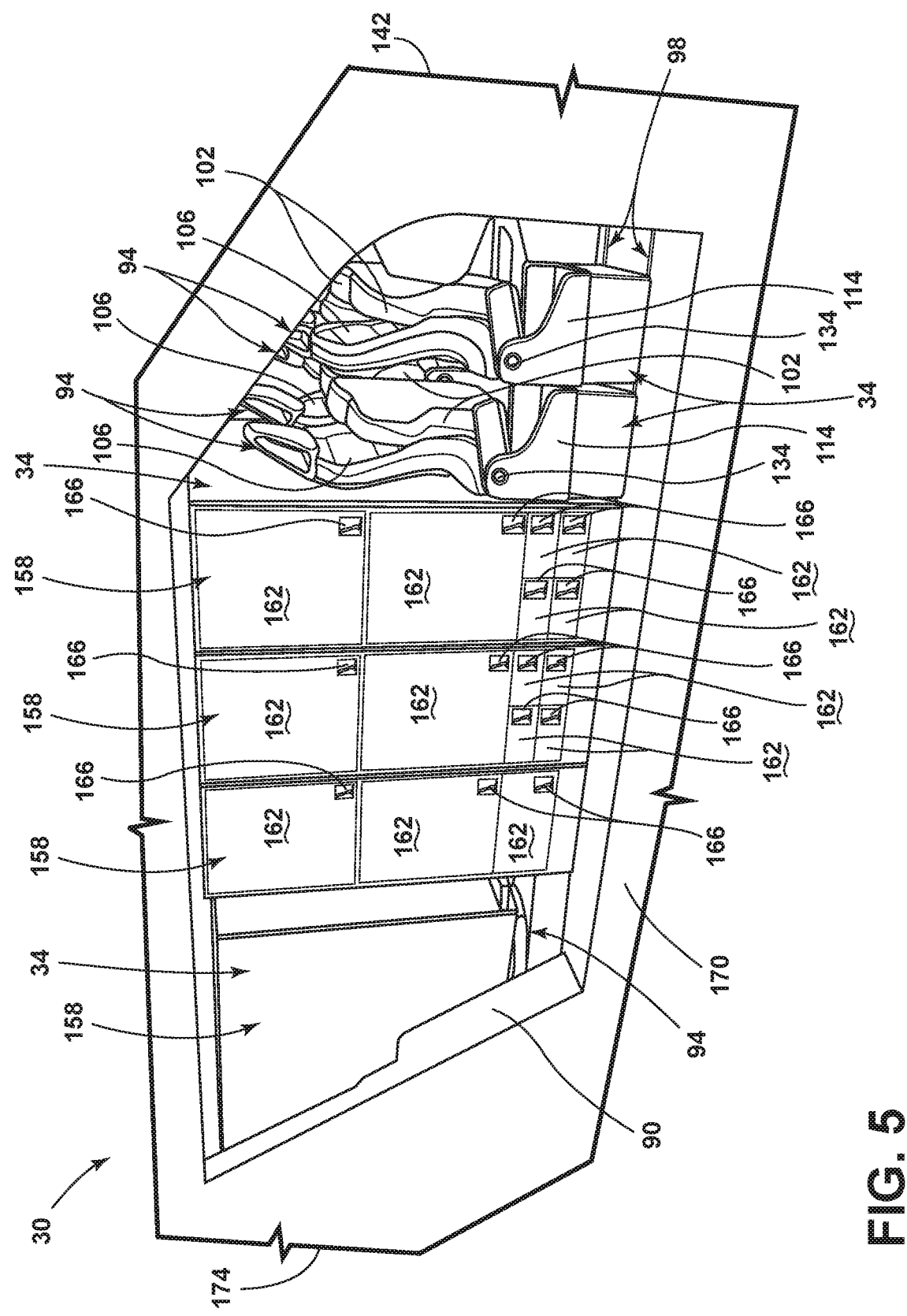
FIG. 5 is a side perspective view of the cabin of the vehicle, illustrating a configuration of the seating assemblies and the storage units, according to another example.
Figure 6:
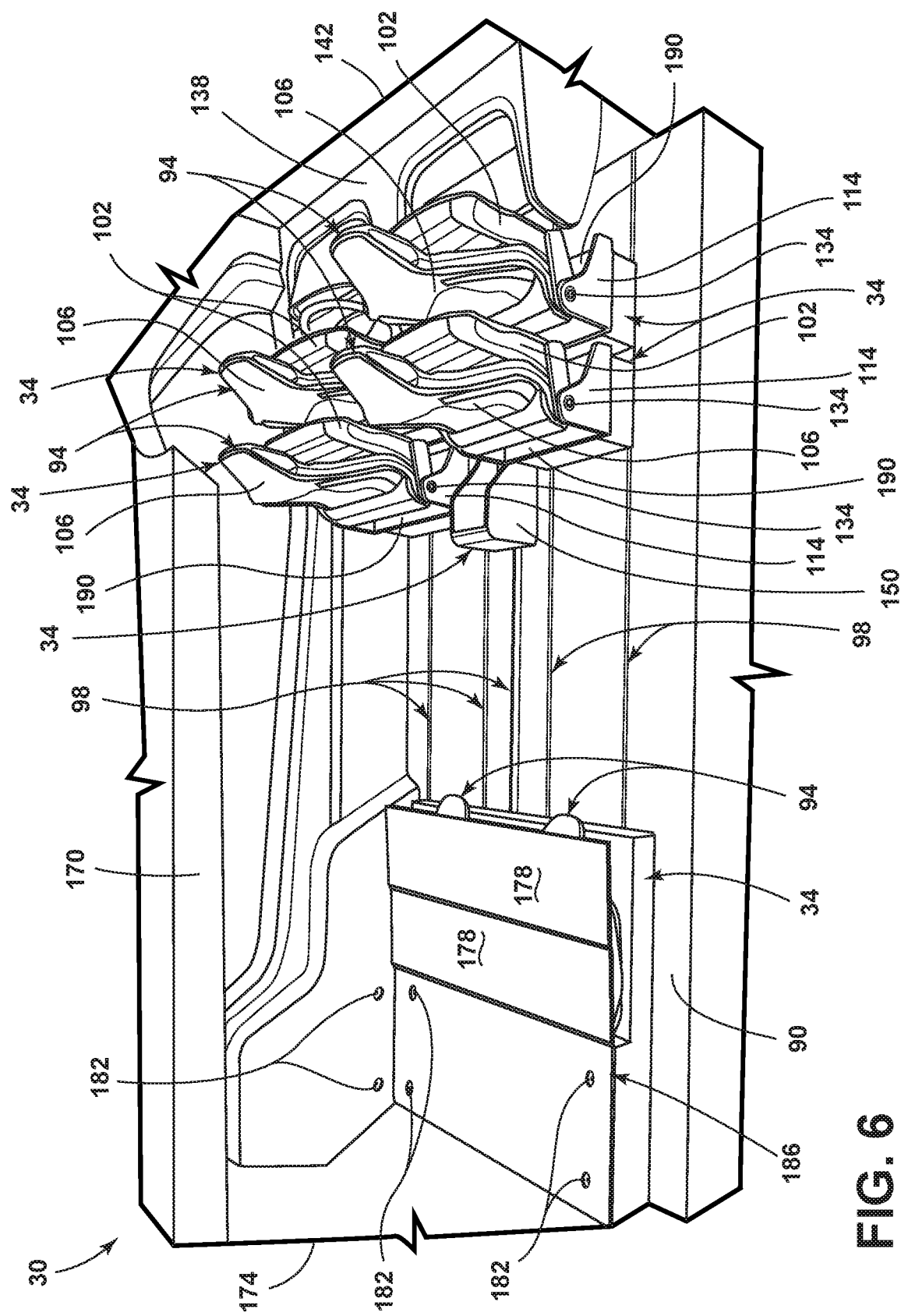
FIG. 6 is a side perspective view of the cabin of the vehicle, illustrating a configuration of the seating assemblies, according to one example.

Referring to FIGS. 4-6, a number of exemplary configurations are illustrated where the vehicle 30 is primarily utilized for cargo transport. In some cargo transport examples, such as that shown in FIG. 4, one or more of the seating assemblies 94 may remain available for occupants that are traveling with the cargo items (e.g., vehicle operators, vehicle monitors, security personnel, etc.). The features and functionalities described above for the cabin 90 of the vehicle 30, the seating assemblies 94, the carriers 114, the carriage portions 118, and the platform 130 can be provided in whole or in part with the examples depicted in FIGS. 4-6 without departing from the concepts disclosed herein, however, for the sake of brevity the features and functionalities will not be repeated. In some cargo transport configurations, such as that depicted in FIG. 4, unused seating assemblies 94 may be removed from the cabin 90 of the vehicle 30 to make room for cargo items to be stored within the cabin 90 while maintaining one or more of the seating assemblies 94 as available for occupants. The cargo items may be stored in storage units 158 that are placed within the cabin 90. The storage units 158 may engage with the rail assemblies 98 such that the storage units 158 are prevented from unintentional motion during maneuvering of the vehicle 30. The storage units 158 may also receive power from the rail assemblies 98 and/or communicate data between the storage units 158 and the vehicle 30 by way of one or more transceivers. The power and/or data communication provided to the storage units 158 may be used for temperature control of one or more storage compartments 162 within the storage units 158, for lighting the storage compartments 162, for locking/unlocking the storage compartments 162, for actuating a door of the storage compartments 162, for actuating the storage units 158 along the rail assemblies 98, and/or for monitoring contents of the storage compartments 162 (e.g., sensors, imagers, etc.). The storage compartments 162 may be provided with latch assemblies 166 that can be actuated manually or automatically to provide access to an interior of the storage compartments 162. The storage compartments 162 can be accessed from a side 170 or a rear 174 of the vehicle 30. Storage units 158 that are accessible from the rear 174 of the vehicle 30 may be positioned on a rear surface 178 of rearward most seating assemblies 94 when the rearward most seating assemblies 94 are placed in a stowed or fold-flat position (see FIG. 6). When storage units 158 are placed on the rear surfaces 178 of the rearward most seating assemblies 94, these storage units 158 may not be secured to the vehicle 30 by way of the rail assemblies 98. Alternatively, the storage units 158 that are placed on the rear surfaces 178 of the rearward most seating assemblies 94 may be secured to the vehicle 30 by interaction with various components of the cabin 90 of the vehicle 30. For example, the storage units 158 that are placed on the rear surfaces 178 of the rearward most seating assemblies 94 may be secured to the vehicle 30 by interacting with the storage units 158 that are secured to the rail assemblies 98, by tethering or anchoring to tie downs 182 within a cargo area 186 of the cabin 90, and/or by other suitable approaches.

With specific reference to FIGS. 5 and 6, the seating assemblies 94 may additionally or alternatively be capable of being stored in a stacked fashion. The seating assemblies 94 may be pivotably coupled to the carriers 114 in a manner that allows the seatback 106 to be placed in a forward-dumped position over the seat 102 (see FIGS. 2 and 3) and/or the seat 102 may be pivoted upward toward the seatback 106 in a stadium-seating manner such that the seat 102 is generally vertical and generally parallel to the seatback 106. Once in a stowed-and-stacked position depicted in FIGS. 5 and 6, the cargo area 186 of the cabin 90 of the vehicle 30 can be increased while maintaining the ability to quickly transition the vehicle 30 back to a primarily passenger transport configuration once cargo items have been delivered or removed. To assume the stowed-and-stacked position the seat 102 of the seating assembly 94 is pivoted upward toward the seatback 106 about the pivot point 134 of the carrier 114. Then, the seating assembly 94 can be actuated to an end (e.g., the front 142 or the rear 174) of the vehicle 30 along the rail assemblies 98 such that the seating assemblies 94 may occupy a substantially smaller footprint or surface area than if the seating assemblies 94 were stored in an alternative manner. In some examples, the seating assemblies 94 may be provided with a storage area 190 between an underside of the seat 102 and the carrier 114. The storage area 190 may be provided as a pass-through or open storage area. The storage area 190 may be utilized by occupants of the seating assemblies 94 to store cargo items. In various examples, including those where the seating assemblies are placed in the stowed-and-stacked position, the storage areas 190 may be aligned in tandem or in-line seating assemblies 94 such that long cargo items (e.g., wood beams) may be stored and supported along their length in a manner that also retains the long cargo items within a limited lateral region. In such an example, the long cargo items can be prevented from affecting passengers or other cargo items during maneuvers of the vehicle 30.

Referring now to FIG. 7, the vehicle 30 can be provided with a plurality of the rail-mounted components 34. In examples, the rail-mounted components 34 may be, but are not limited to, seating assemblies 94, floor consoles, center consoles, storage units 158 that include multiple storage compartments 162, and the like. In various examples, the rail-mounted component 34 can removably couple with the rail assembly 98 and/or the carriage assembly 122. For example, the rail-mounted component 34 can removably couple with the carriage assembly 122 such that actuation of the carriage assembly 122 along the rail assembly 98 results in corresponding actuation of the associated rail-mounted component 34. In some examples, the rail-mounted component(s) 34 can be coupled to more than one of the carriage assemblies 122 such that coordinated actuation of the plurality of carriage assemblies 122 results in corresponding actuation of the associated rail-mounted component(s) 34. The vehicle 30 can be provided with one or more track assemblies 194. A pair of track assemblies 194 may be referred to as a track plank 196. The track assemblies 194 and/or the track planks 196 can be arranged along longitudinal, lateral, and/or angular (e.g., diagonal) directions within the cabin 90. In the depicted example, the track planks 196 are aligned in a longitudinal direction within the cabin 90 and the track planks 196 are arranged with centerlines 198 that are parallel to a longitudinal axis of the vehicle 30.

Referring to FIGS. 8-16, the track assembly 194 can be coupled to a portion of the cabin 90. In various examples, the track assembly 194 can include a retention structure 202, the carriage structure 126, and the rail assembly 98. The carriage structure 126 may extend through the retention structure 202. The rail assembly 98 can receive the retention structure 202 and the carriage structure 126 such that the retention structure 202 and the carriage structure 126 slidably couple with the rail assembly 98. The retention structure 202 and the carriage structure 126 can together define the carriage assembly 122. The carriage assembly 122 can further include the carriage portion 118. The rail assembly 98 defines an interior aperture 206. The interior aperture 206 may be inaccessible from a top side 210, a first lateral side 214, and a second lateral side 218 of the rail assembly 98. A first external channel 222 may be defined by the first lateral side 214 of the rail assembly 98. A carriage power conductor 226 can be received within the first external channel 222. A second external channel 230 may be defined by the second lateral side 218 of the rail assembly 98. A carriage data conductor 234 can be received within the second external channel 230. In various examples, a first interior channel 238 may be defined by the first lateral side 214 of the rail assembly 98. Alternatively, the first interior channel 238 may be defined by the top side 210 or a bottom side 242 of the rail assembly 98. In some examples, the first interior channel 238 may be angularly displaced relative to the top side 210, the first lateral side 214, the second lateral side 218, and/or the bottom side 242 (see FIGS. 8 and 14-15). Accordingly, it is contemplated that the first interior channel 238 may be defined by more than one of the top side 210, the first lateral side 214, the second lateral side 218, and the bottom side 242 of the rail assembly 98. A tractor power conductor 246 can be received within the first interior channel 238. In various examples, a second interior channel 250 may be defined by the second lateral side 218 of the rail assembly 98. As with the first interior channel 238, alternative examples may provide the second interior channel 250 as defined by the top side 210 or the bottom side 242 of the rail assembly 98. In some examples, the second interior channel 250 may be angularly displaced relative to the top side 210, the first lateral side 214, the second lateral side 218, and/or the bottom side 242 (see FIGS. 8 and 14-15). Accordingly, it is contemplated that the second interior channel 250 may be defined by more than one of the top side 210, the first lateral side 214, the second lateral side 218, and the bottom side 242 of the rail assembly 98. It is further contemplated that the first interior channel 238 and the second interior channel 250 may be defined by a single side (e.g., the top side 210, the first lateral side 214, the second lateral side 218, or the bottom side 242) of the rail assembly 98 without departing from the concepts disclosed herein. The first and second interior channels 238, 250 are each positioned within the interior aperture 206 of the rail assembly 98. A tractor data connector 254 can be received within the second interior channel 250. A tractor assembly 258 can movably couple with the rail assembly 98 within the interior aperture 206.

Referring now to FIGS. 8-16, the top side 210 and the bottom side 242 are positioned opposite one another on the rail assembly 98. Similarly, the first and second lateral sides 214, 218 are positioned opposite one another. While described and depicted as top and bottom sides 210, 242 relative to their orientation in FIGS. 8-16, the present disclosure is not so limited. The bottom side 242 may alternatively be referred to as a vehicle-mounting side. Said another way, the bottom side 242 can directly abut a portion of the vehicle 30 upon which the track assembly 194 is mounted. Accordingly, in examples where the track assembly 194 is mounted to a floor of the cabin 90 of the vehicle 30, the bottom side 242 can be oriented vertically below the top side 210. Similarly, in examples where the track assembly 194 is mounted to a ceiling or roof of the cabin 90 of the vehicle 30, the bottom side 242 can be oriented vertically above the top side 210 as the bottom side 242 is mounted to the vehicle 30. It is contemplated that the bottom side 242, or vehicle-mounting side, may be coupled to sides of the vehicle 30 rather than to the floor or the ceiling of the vehicle 30. Accordingly, in such examples, the top and bottom sides 210, 242 may be oriented as lateral sides. While these various orientations and arrangements of the track assembly 194 within the cabin 90 of the vehicle 30 are contemplated and in keeping with the concepts disclosed herein, for the sake of brevity and clarity, the track assembly 194 is primarily discussed with reference to the orientation of the track assembly 194 when the track assembly 194 is coupled to the floor of the cabin 90.

Referring again to FIGS. 8-16, the bottom side 242 can be provided with one or more flanges 262 that extend radially outward from a body 266 of the rail assembly 98. The flanges 262 can provide lateral stability to the rail assembly 98. For example, the flanges 262 can provide lateral stability to the rail assembly 98 when forces are applied to the rail assembly 98 (e.g., by the retention structure 202 and/or the carriage structure 126) during normal operation and/or in the event of an impact (e.g., vehicle-to-vehicle and/or cargo impacting a rail-mounted component 34). The flanges 262 can provide lateral stability in a direction that is angularly offset from the direction of travel along the rail assembly 98 (e.g., perpendicular to a direction of travel along the rail assembly 98). Additionally, in some examples, the flanges 262 can be utilized as a coupling portion that receives one or more fasteners 270 that secure the rail assembly 98 to the vehicle 30 (see FIGS. 12-13). In examples that do not utilize the flanges 262 for receiving fasteners 270 to secure the rail assembly 98 to the vehicle 30, the bottom side 242 of the rail assembly 98 can define a coupling slot 274. The coupling slot 274 can receive anchors 278 that retain the rail assembly 98 to a portion of the vehicle 30. Additionally or alternatively, the anchors 278 can retain a drive rack 282 to the rail assembly 98. Accordingly, the anchors 278 can extend through a portion of the bottom side 242 into the interior aperture 206 such that the anchors 278 can engage with the drive rack 282 (e.g., threadably engage) and ultimately retain the drive rack 282 in a desired position within the interior aperture 206. The bottom side 242 can define a drive rack receiving slot 286 that receives the drive rack 282. In various examples, the drive rack receiving slot 286 can have a tapered cross-section such that an interference fit is provided with the drive rack 282. For example, the drive rack receiving slot 286 may have a generally pyramidal cross-section that is complementary to a cross-section of the drive rack 282 such that, upon inserting the drive rack 282 into the drive rack receiving slot 286, the drive rack 282 is retained in a vertical direction and/or a horizontal direction that is non-parallel with a direction of travel along the rail assembly 98 (e.g., left-to-right as oriented in FIGS. 8-16). Such retention of the drive rack 282 in vertical and/or horizontal directions that are non-parallel with the direction of travel along the rail assembly 98 may be accomplished in the absence of the anchors 278. In some examples, the anchors 278 can retain the drive rack 282 in a desired position in a horizontal direction that is parallel or substantially parallel to the direction of travel along the rail assembly 98, even if the anchors 278 do not threadably engage with the drive rack 282. The anchors 278 can engage with an underside of the drive rack 282. The underside of the drive rack 282 can be defined as a side that is opposite teeth 290 of the drive rack 282.

Referring further to FIGS. 8-16, the teeth 290 of the drive rack 282 can be engaged by the tractor assembly 258 such that the tractor assembly 258 can move along the drive rack 282 and ultimately traverse the length of the rail assembly 98. For example, a worm gear 294 can engage with the teeth 290 on the drive rack 282 such that rotation in a first rotational direction (e.g., clockwise) results in the tractor assembly 258 actuating, or climbing, in a first linear direction (e.g., forward); and rotation in a second rotational direction (e.g., counterclockwise) results in the tractor assembly 258 actuating, or climbing, in a second linear direction (e.g., rearward). In various examples, the tractor assembly 258 can be provided with one or more guide members 298 that can engage with a portion of the rail assembly 98 within the interior aperture 206 such that the tractor assembly 258 maintains a desired positioning within the interior aperture 206. Accordingly, binding, sticking, and/or rattling of components of the track assembly 194 can be reduced in frequency of occurrence and/or severity. The guide members 298 can aid in vertical and/or horizontal positioning of the tractor assembly 258 within the interior aperture 206. The guide members 298 can also decrease a level of felt friction that the tractor assembly 258 may experience as the tractor assembly 258 traverses the rail assembly 98. The decreased level of felt friction by the tractor assembly 258 as a result of the guide members 298 being made of a low friction and/or self-lubricating material (e.g., ultra-high molecular weight polyethylene). The guide members 298 can engage with protruding features 302 of the rail assembly 98 that extend inwardly from the sides of the rail assembly 98 into the interior aperture 206. For example, the protruding features 302 can extend inwardly from the first and second lateral sides 214, 218 toward the interior aperture 206. The engagement between the guide members 298 and the protruding features 302 can facilitate and/or aid in retaining a horizontal and/or vertical position of the tractor assembly 258 within the interior aperture 206.

Referring still further to FIGS. 8-16, in examples that utilize more than one guide member 298, a guide member biasing member 306 can be provided that allows the guide members 298 to move between extended and retracted positions. For example, the guide member biasing member 306 can bias the guide members 298 to an extended position such that the guide members 298 are actively pressed into engagement with the protruding features 302. In various examples, the guide member biasing member 306 can be a compression spring, a coil spring, a leaf spring, elastomeric tubing, polymeric tubing, rubber tubing, or any other suitable structure or feature that biases the guide members 298 to an extended position. Movement of the guide members 298 can be constrained by adjacent portions of a tractor frame 310 positioned generally parallel to one another and extending along an extension axis of the guide members 298. As depicted, the extension axis may be a horizontal axis. The tractor frame 310 in the region of the guide members 298 can define one or more guide member shoulders 314. The guide member shoulders 314 can extend inwardly toward the guide members 298 and be positioned between the guide members 298. The guide member shoulders 314 can provide an innermost stop for the retracted position of the guide members 298. Additionally or alternatively, the guide member shoulders 314 can provide a region of narrower inner diameter that can aid in retention of the guide member biasing member 306 while also aiding in guiding compression and/or extension of the guide member biasing member 306.

Referring yet again to FIGS. 8-16, the tractor assembly 258 can be provided with one or more electromagnets 318. At least one of the electromagnets 318 is provided with electrical leads 322 that can receive power from a power supply, such as a vehicle battery. Accordingly, the electromagnet(s) 318 can be selectively energized to introduce a magnetic field when desired. The introduction of the magnetic field can be utilized to disengage or unlock the retention structure 202 and transmit motion of the tractor assembly 258 to the retention structure 202 and/or carriage structure 126, as will be discussed in more detail below. The power received by the electromagnet(s) 318 can be transmitted from the power supply by the tractor power conductor 246. The tractor power conductor 246 can also provide power from the power supply to run a drive motor 326 (see FIG. 18) that drives the worm gear 294 to rotate. One or more tractor power brush assemblies 330 can engage with the tractor power conductor 246. The vehicle 30 and the tractor assembly 258 can exchange data and/or information by way of the second interior channel 250. The tractor assembly 258 includes tractor data brush assemblies 334 that engage with the second interior channel 250. The data and/or information that the vehicle 30 and the tractor assembly 258 exchange can include, but is not limited to, positional information about a present location of the tractor assembly 258 within the rail assembly 98, instructions about a desired location of the tractor assembly 258 within the rail assembly 98 for the tractor assembly 258 to move to, instructions about a number and direction of rotations of the worm gear 294 to achieve the desired location from the present location, instructions about engaging and/or disengaging the electromagnet(s) 318, a status or health of the tractor assembly 258 (e.g., are components of the tractor assembly 258 operating as expected and/or intended), a coupled or decoupled state of the tractor assembly 258 with a rail-mounted component 34, and/or whether the retention structure 202 has been successfully placed in the engaged or disengaged position. Accordingly, the vehicle 30 can relay information about the interaction of various components of the track assembly 194 to other components of the track assembly 194 and/or other components of the vehicle 30. Therefore, improved integration of components of the vehicle 30 can be achieved while providing improved monitoring of the components of the vehicle 30. The tractor power and data brush assemblies 330, 334 will be discussed in more detail below.

Referring further to FIGS. 8-16, the carriage structure 126 can be provided with one or more carriage power brush assemblies 338 and/or one or more carriage data brush assemblies 342. The carriage power brush assembly 338 engages with the carriage power conductor 226 such that rail-mounted components 34 that are coupled to the carriage structure 126 can receive power from the power supply. In examples where the rail-mounted component 34 is a seating assembly, the power received from the power supply by the carriage power brush assembly 338 can transmit power to seat-mounted components that can include, but are not limited to, safety devices, safety restraints, seat-mounted airbags, occupancy status sensors/indicators, comfort components, seat heating components, seat ventilation components, seat articulation motors (e.g., seat back reclining, extension of lower leg support, adjustment of side bolsters, adjustment of headrest position, swivel of seating assembly relative to vehicle 30, and/or armrest deployment/stowage), charging stations for electronic devices, and/or seat-mounted entertainment solutions (e.g., audio and/or visual entertainment). In examples where the rail-mounted components 34 are consoles (e.g., floor consoles or center consoles), the power received from the power supply by the carriage power brush assembly 338 can transmit power to console components. The console components that receive power can include, but are not limited to, light sources (e.g., incandescent bulbs and/or LEDs), compartment locks, thermal management systems (e.g., for cup holders and/or storage compartments), charging stations for electronic devices, and/or actuation motors (e.g., for storage compartment lids/covers). In examples where the rail-mounted components 34 are storage units or rows of lockers, the power received from the power supply by the carriage power brush assembly 338 can transmit power to storage unit components. The storage unit components can include, but are not limited to, light sources (e.g., incandescent bulbs or LEDs), locks for individual storage compartments of the storage units, thermal management systems (e.g., temperature controlled storage compartments for transport of perishable foods and/or transport of delivered hot foods), charging stations for electronic devices, stored item sensors/indicators (e.g., weight sensors, optical sensors, cameras, and/or photoelectric sensors), and/or actuation motors for doors on individual storage compartments.

Referring still further to FIGS. 8-16, the carriage data brush assembly 342 engages with the carriage data conductor 234 such that the rail-mounted components 34 and the vehicle 30 can communicate status, health, and/or instructions to one another. In examples where the rail-mounted components 34 are seating assemblies, the data communicated between the carriage data conductor 234 and the carriage data brush assembly 342 can include, but is not limited to, position along the rail assembly 98, rotational position of actuation motors, rotational position of seat components relative to one another (e.g., seat back, seat, lower leg support, headrest, armrests, and/or side bolsters), a swivel rotational position relative to the vehicle 30, health of the actuation motors (e.g., presence of binding, sticking, or other departures from expected/intended operation), occupancy status, on/off state of seat-mounted components (e.g., heating, ventilation, actuation motors, and/or entertainment solutions), engaged vs. disengaged state of safety restraints (e.g., buckled vs. unbuckled), health of safety devices, and/or health of seat-mounted airbags. In examples where the rail-mounted components 34 are consoles (e.g., floor consoles or center consoles), the data communicated between the carriage data conductor 234 and the carriage data brush assembly 342 can include, but is not limited to, position along the rail assembly, open vs. closed status of lids or covers to storage compartments, on/off status of light sources, locked vs. unlocked status of compartment locks, on/off status of thermal management systems, thermal status of thermal management systems (e.g., providing heated vs. cooled environment), and/or utilization state of charging stations (e.g., electronic device connected vs. no electronic device connected). In examples where the rail-mounted components 34 are storage units or rows of lockers, the data communicated between the carriage data conductor 234 and the carriage data brush assembly 342 can include, but is not limited to, on/off status of light sources, locked vs. unlocked status for individual storage compartments, on/off status of thermal management systems, thermal status of thermal management systems (e.g., providing heated vs. cooled environment), utilization state of charging stations (e.g., electronic device connected vs. no electronic device connected), and/or item stored vs. empty status of a given storage compartment.

Referring further to FIGS. 8-16, the carriage power conductor 226, the carriage data conductor 234, the tractor power conductor 246, and the second interior channel 250 are each provided with conductive members 346. The conductive members 346 are engaged by corresponding brushes 350 in each of the brush assemblies. For example, the conductive members 346 in the carriage power conductor 226 are engaged by brushes 350 in the carriage power brush assemblies 338, the conductive members 346 in the carriage data conductors 234 are engaged by brushes 350 in the carriage data brush assemblies 342, the conductive members 346 in the tractor power conductors 246 are engaged by brushes 350 in the tractor power brush assemblies 330, and the conductive members 346 in the tractor data conductors 254 are engaged by brushes 350 in the tractor data brush assemblies 334. In some examples, such as those depicted in FIGS. 10, 11, 14, and 15, a biasing member 354 can be provided that biases one or more of the conductive members 346 to an extended position. Additionally or alternatively, the biasing member 354 can be provided such that one or more of the brushes 350 is biased to an extended position. For example, see FIG. 12 where the biasing members 354 are provided behind one or more of the brushes 350 such that the associated brushes 350 are biased to the extended position while the biasing members 354 are omitted from the conductive members 346; as well as FIG. 15 where the biasing members 354 are provided behind one or more of the conductive members 346 and one or more of the brushes 350. Accordingly, active engagement between the conductive members 346 and the brushes 350 can be maintained such that power and/or data may be transferred between the vehicle 30 and the carriage assembly 122 by way of the rail assembly 98.

Referring again to FIGS. 8-16, the carriage structure 126 can be provided with upper rollers 358 and/or lower rollers 362. The upper and lower rollers 358, 362 cooperate to retain a vertical position of the carriage structure 126 relative to the rail assembly 98. While the upper and lower rollers 358, 362 are described as retaining a vertical position of the carriage structure relative to the rail assembly 98, the present disclosure is not so limited. Rather, the upper and lower rollers 358, 362 can more broadly be described as retaining the carriage structure 126 to the rail assembly 98 in a direction that is non-parallel with the direction of travel along the rail assembly 98. Accordingly, the upper and lower rollers 358, 362 retain the carriage structure 126 to the rail assembly 98 while allowing for actuation along the rail assembly 98 to occur. The upper rollers 358 slidably engage with a surface of the top side 210 of the rail assembly 98. The lower rollers 362 can slidably engage with surfaces that are defined by the first lateral side 214, the second lateral side 218, and/or the top side 210. For example, the lower rollers 362 can slidably engage with an underside of rail shoulders 366 that are defined by the rail assembly 98. The rail shoulders 366 can be defined by a difference in a distance between exterior surfaces of the first and second lateral sides 214, 218 and an overall width of the top side 210. The upper and lower rollers 358, 362 can be, but are not limited to, wheels, bearings, and/or glide bars (e.g., low friction non-rotating structures). In various examples, the lower rollers 362 can engage with a component that is inserted or otherwise provided in or proximate to the rail shoulders 366. For example, the lower rollers 362 can slidably engage with a locking rail 370.

Referring further to FIGS. 8-16, the locking rail 370 can be T-shaped with a leg 374 and a cross-member 378. The locking rail 370 can be received within a locking rail channel 382 that is defined by the rail assembly 98. For example, the locking rail channel 382 can be defined by one or more of the top side 210, the first lateral side 214, and the second lateral side 218. The locking rail channel 382 is complementarily shaped to receive the locking rail 370. Accordingly, the cross-member 378 can provide lateral retention forces to retain the locking rail 370 within the locking rail channel 382 during normal operation. In various examples, the leg 374 of the locking rail 370 can define recesses 386 that receive a portion of the retention structure 202. The retention structure 202 can be provided with locking pawls 390 that engage with the recesses 386. The locking pawls 390 can extend downwardly from an upper portion 394 of the retention structure 202 toward the rail assembly 98. The locking pawls 390 include an engagement end 398 that engages with the recesses 386 in the locking rail 370. In various examples, the engagement ends 398 can be arcuate in shape such that the engagement ends 398 engage with an underside of the locking rail 370. The underside of the locking rail 370 can define the recesses 386 that receive the engagement ends 398 of the locking pawls 390. In some examples, the locking pawls 390 may aid in retention of the carriage structure 126 such that the lower rollers 362 may be omitted.

Figure 10:
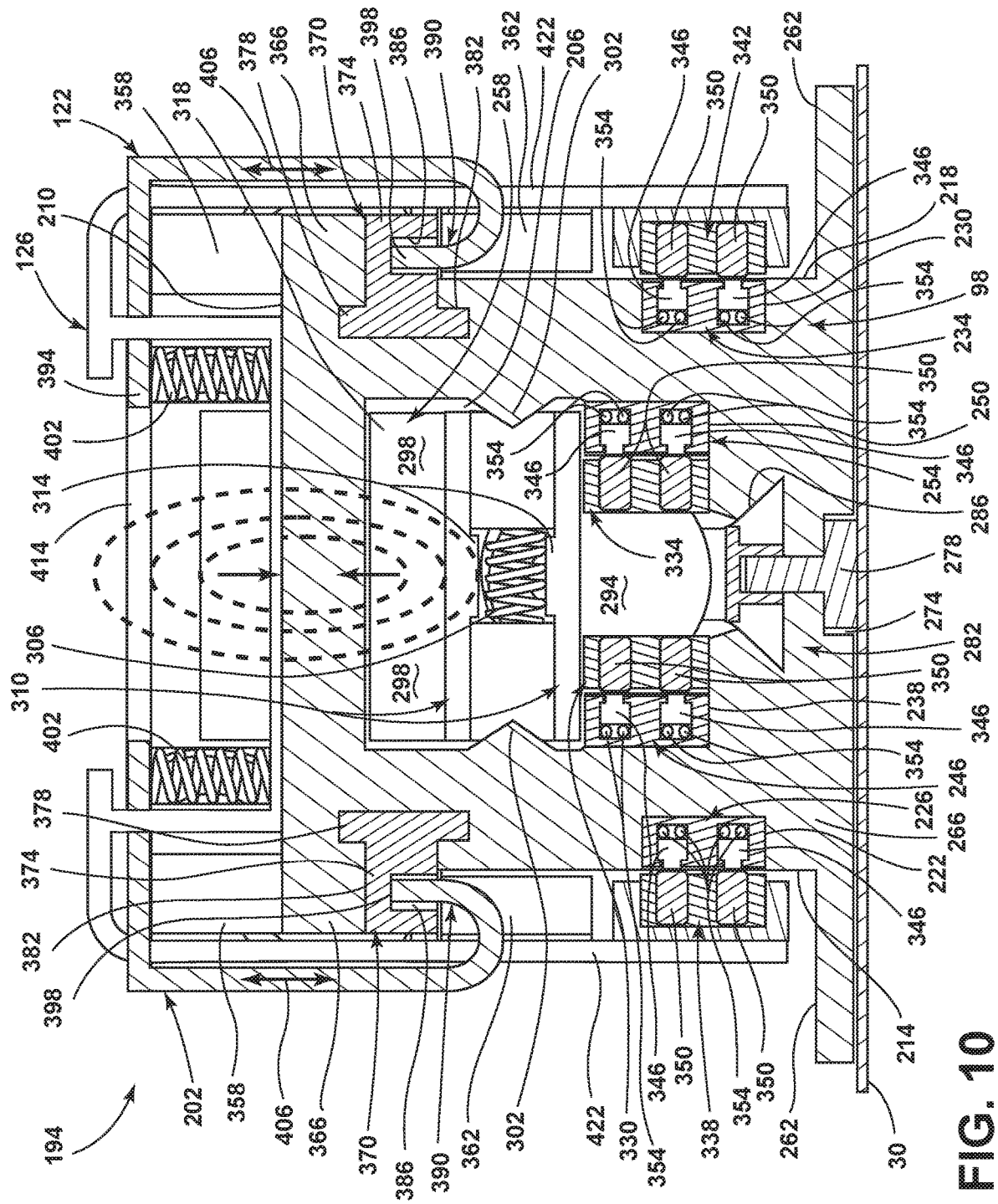
FIG. 10 is a cross-sectional view of the track assembly, taken along line X-X of FIG. 9, illustrating an engagement between a rail assembly, a carriage assembly, and a tractor assembly, according to one example.
Figure 11:
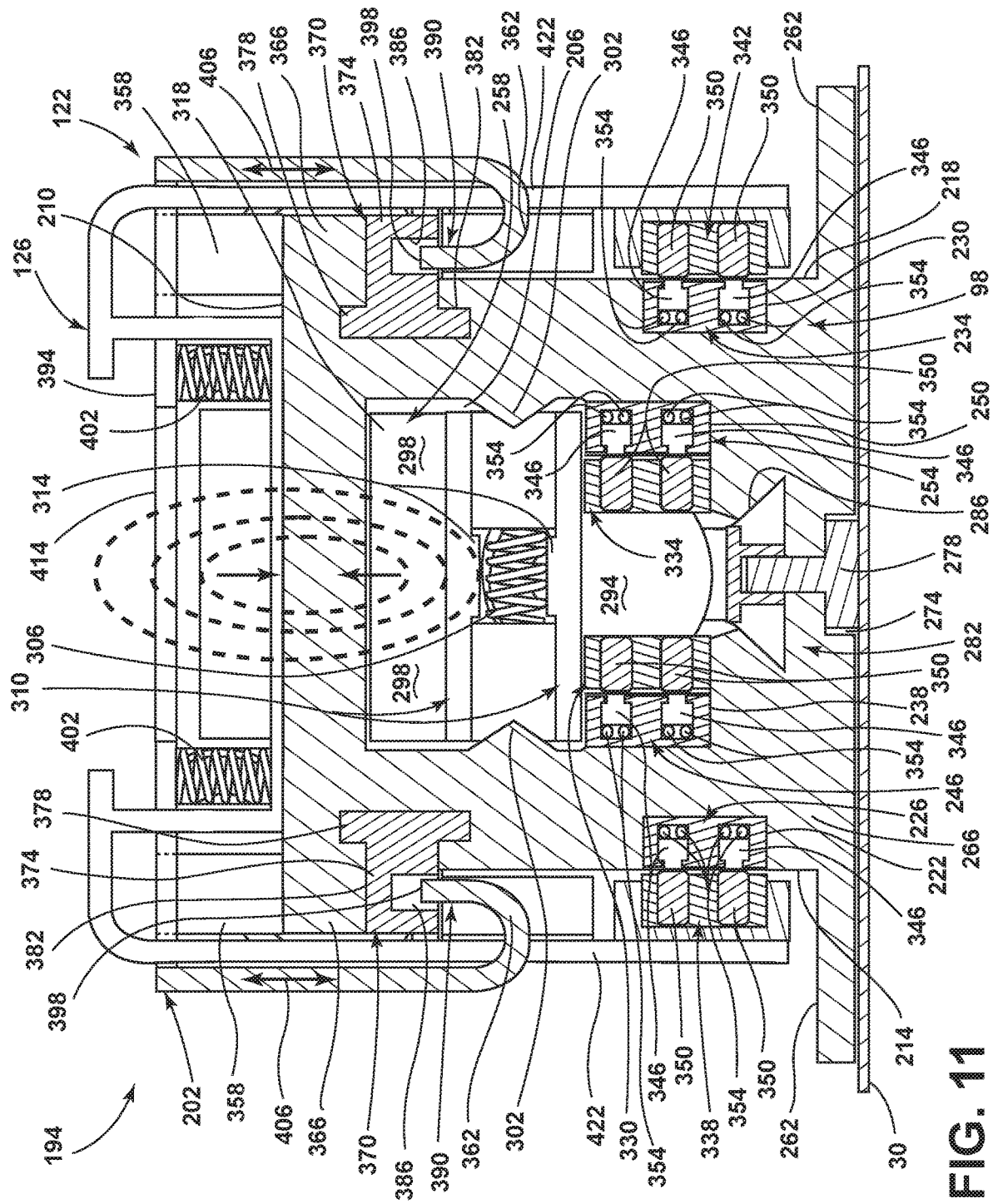
FIG. 11 is a cross-sectional view of the track assembly, taken along line X-X of FIG. 9, illustrating a retention structure in an at least partially-lowered position, according to one example.
Figure 12:
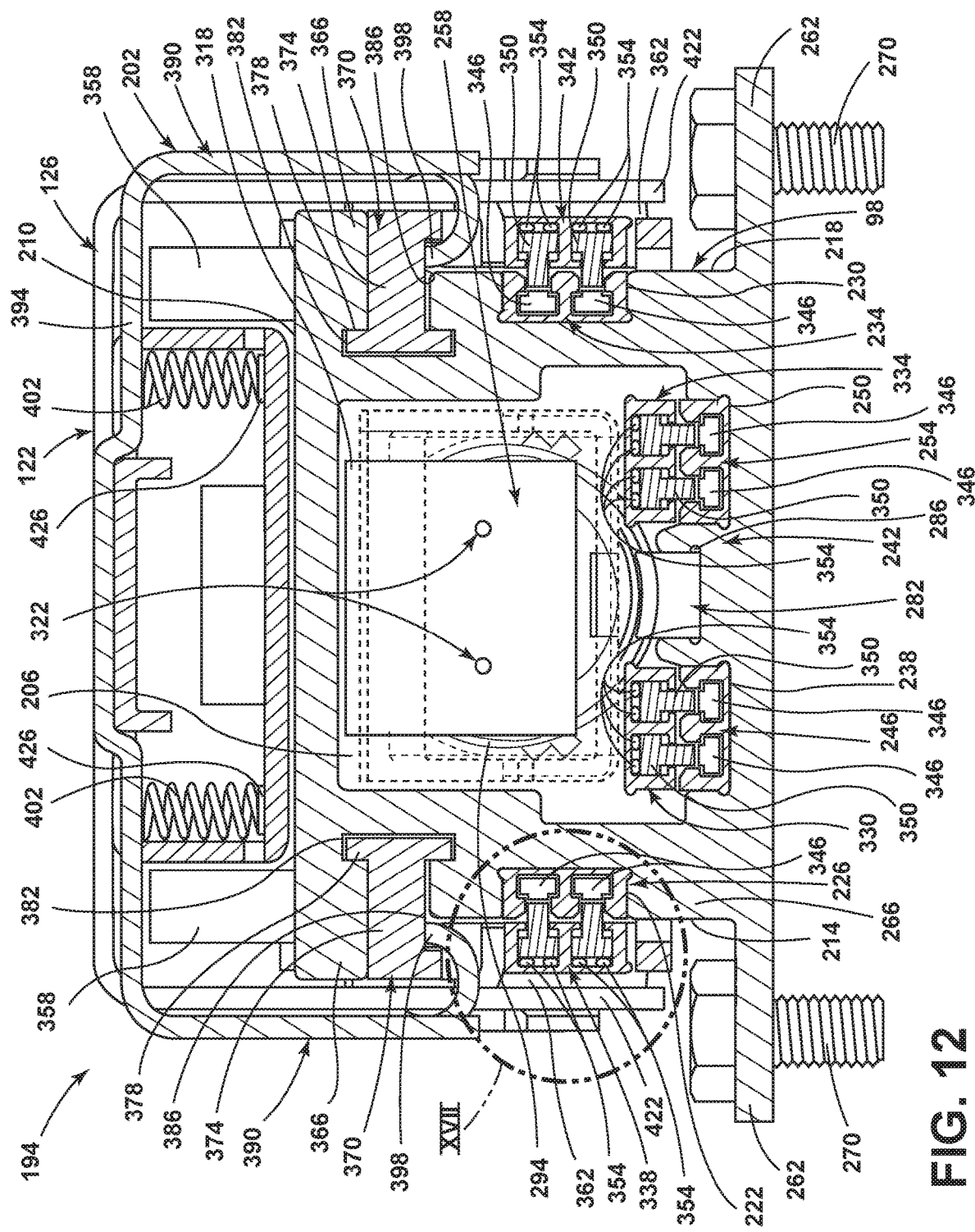
FIG. 12 is a cross-sectional view of the track assembly, taken along line X-X of FIG. 9, illustrating the engagement between the rail assembly, the carriage assembly, and the tractor assembly, according to another example.
Figure 13:
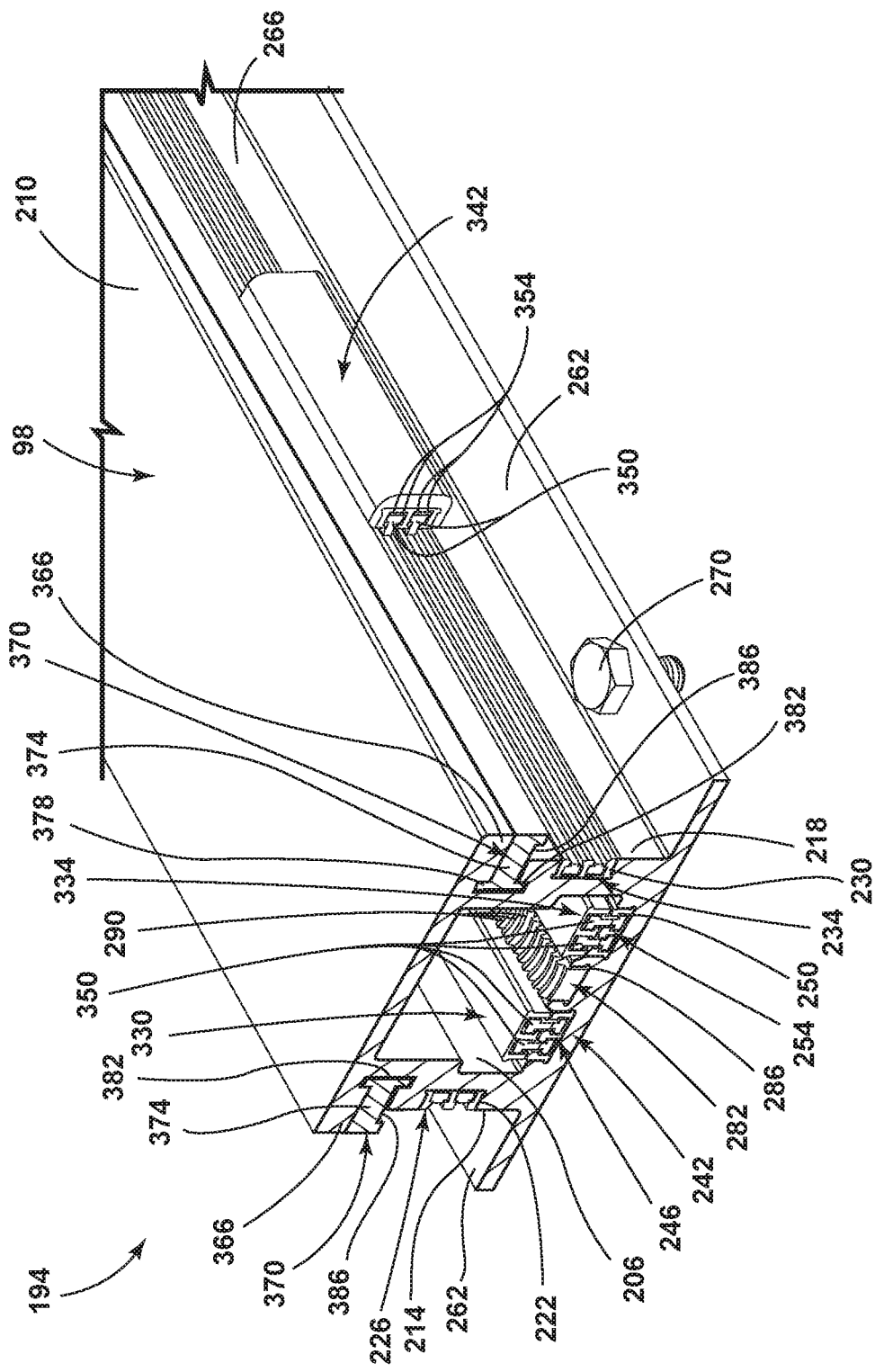
FIG. 13 is a side perspective view of the rail assembly, illustrating an engagement between a carriage data conductor and a carriage data brush assembly, an engagement between a tractor power conductor and a tractor power brush assembly, and an engagement between a tractor data conductor and a tractor data brush assembly, according to one example.
Figure 14:
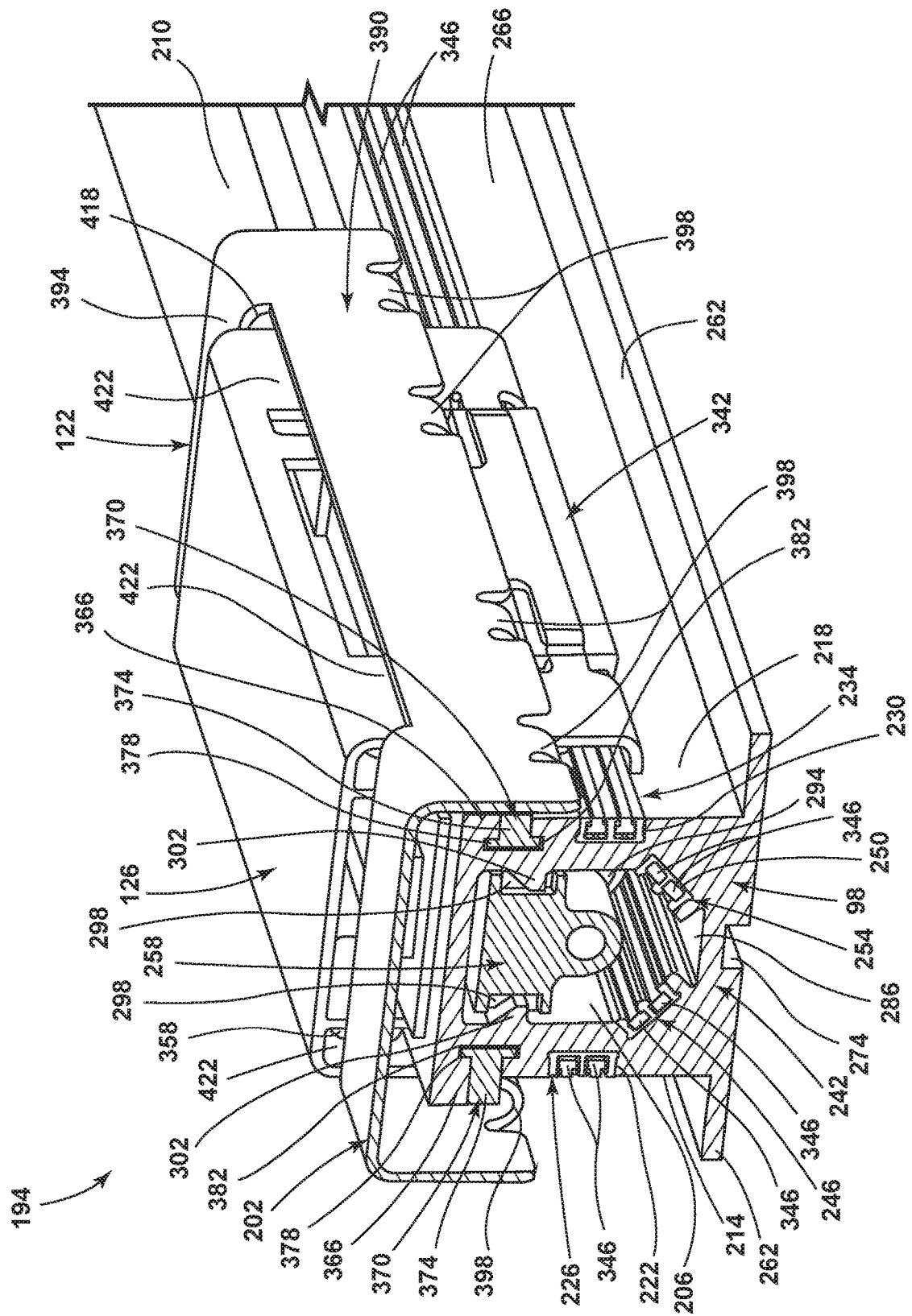
FIG. 14 is a side perspective view of the track assembly, illustrating various components of the track assembly, according to another example.
Figure 15:
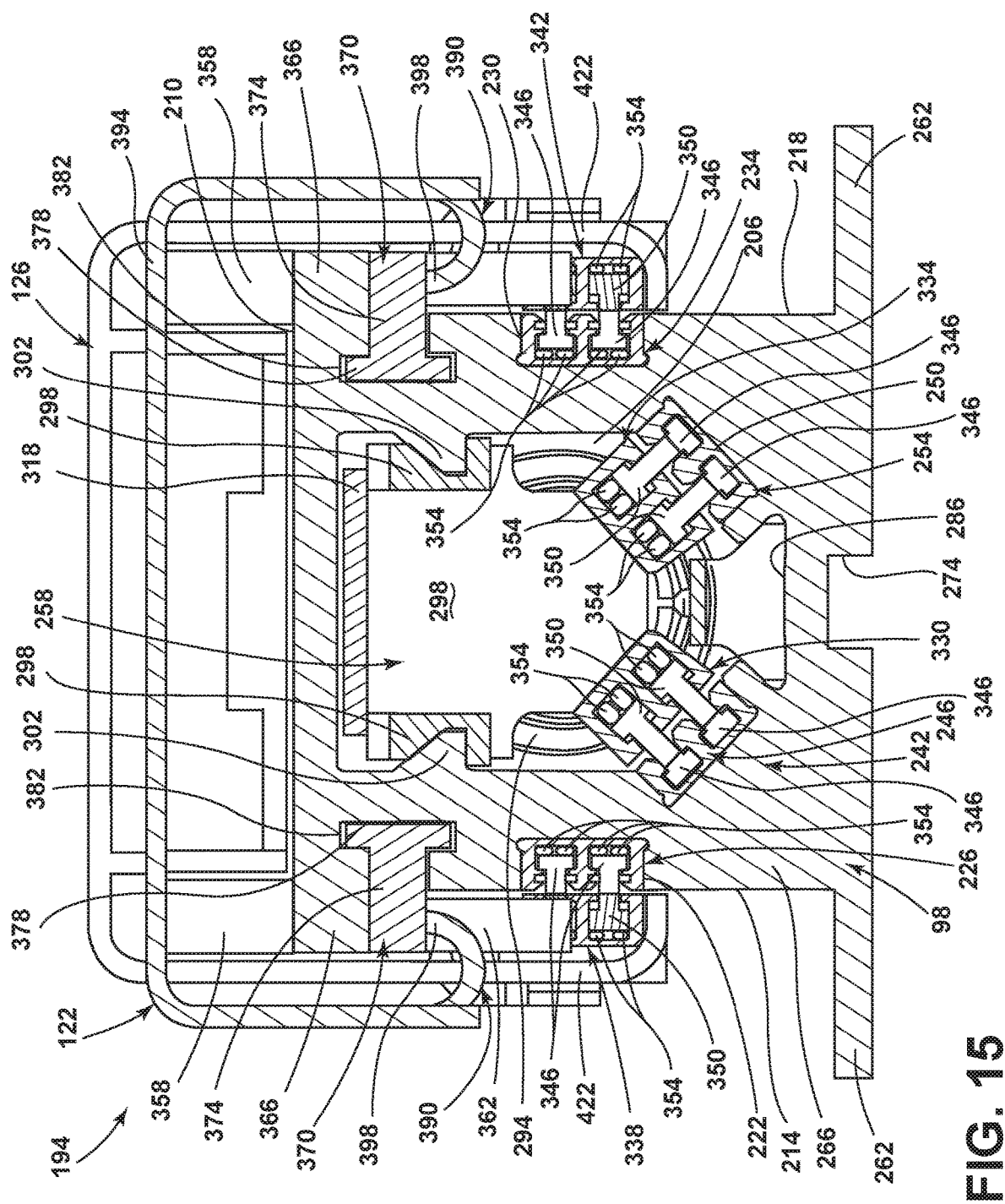
FIG. 15 is an end-on or front view of the track assembly, illustrating the engagement between various components of the track assembly, according to one example.
Figure 16:
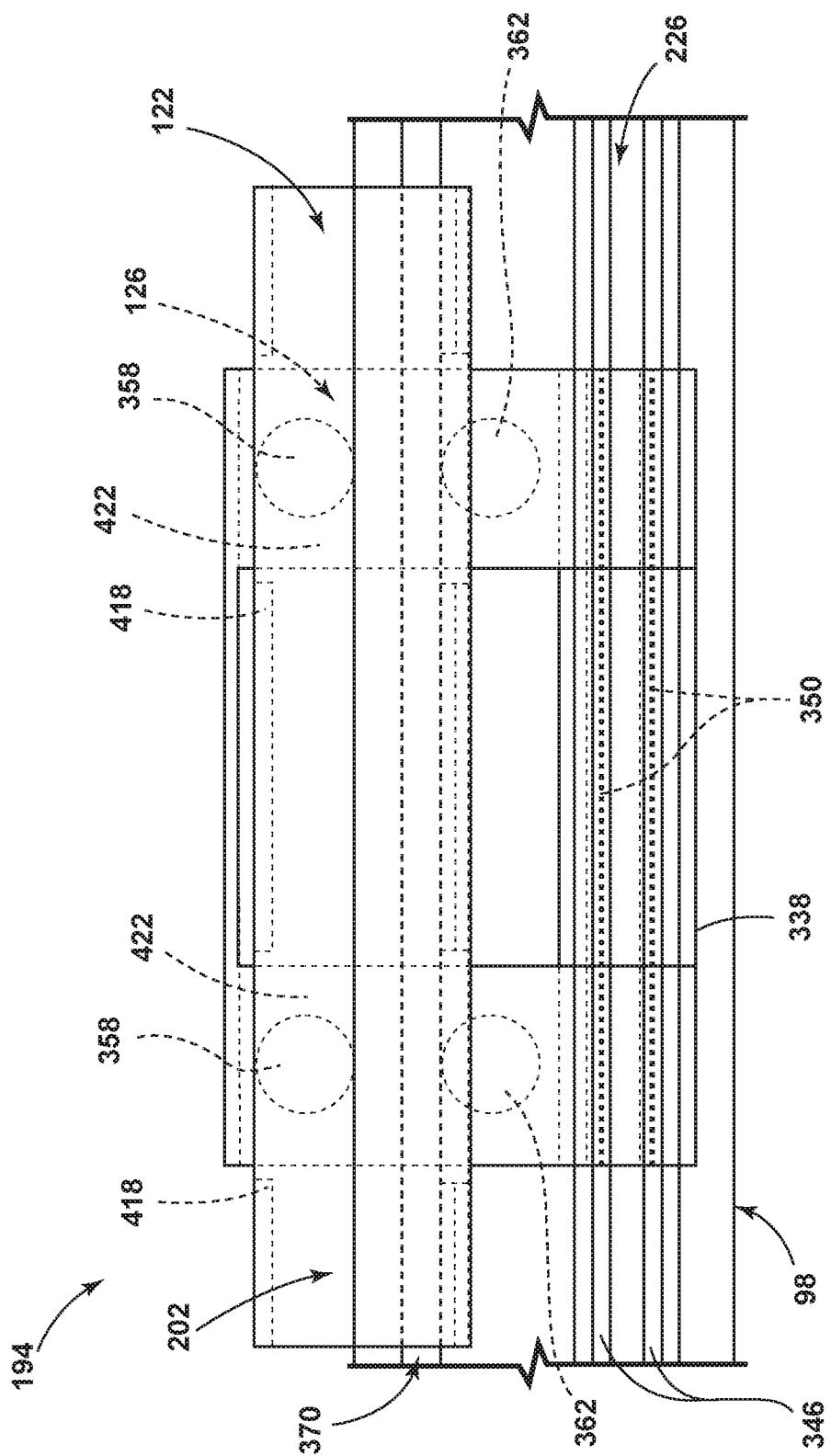
FIG. 16 is a side view of the track assembly, illustrating a carriage structure passing through the retention structure, according to one example.

Referring yet again to FIGS. 8-16, the retention structure 202 is operable between raised and lowered positions. The raised position, in one example, is depicted in FIG. 10. An at least partially-lowered position, in one example, is depicted in FIG. 11. In some examples, the engagement end 398 of the locking pawl 390 does not fully exit a depth of the recess 386 in the locking rail 370 prior to movement of the retention structure 202 and the carriage structure 126 along the rail assembly 98. In such an example, the recesses 386 in the locking rail 370 may be interconnected with adjacent others of the recesses 386 by a groove that extends along the locking rail 370, where the groove has a depth that is shallower or less than the depth of the recesses 386. Accordingly, the locking rail 370 may permit actuation along the rail assembly 98 while preventing unintentional decoupling of the retention structure 202 from the rail assembly 98 in directions that are non-parallel to the direction of actuation of the carriage assembly 122 along the rail assembly 98. In other examples, the engagement end 398 of the locking pawl 390 fully exits the recess 386 in the locking rail 370 prior to movement of the retention structure 202 and the carriage structure 126 along the rail assembly 98. In either example, regardless of whether the engagement end 398 fully exits the recess 386 prior to actuation of the retention structure 202 and the carriage structure 126, the dimensions and/or materials of the retention structure 202, the carriage structure 126, and/or the rail assembly 98 can prevent unintentional decoupling of the retention structure 202 from the rail assembly 98. For example, in the event that the engagement end 398 fully exits the recess 386 prior to actuation along the rail assembly 98, the size and positioning of the retention structure 202 relative to the rail assembly 98 can prevent unintentional decoupling by the engagement ends 398 contacting the first or second lateral sides 214, 218 depending on the direction of an external force. Accordingly, the retention structure 202 can be prevented from unintentional decoupling from the rail assembly 98. The same fit and prevention of unintentional decoupling can also be provided in examples where the engagement ends 398 do not fully exit the depth of the recesses 386 prior to actuation along the rail assembly 98.

Referring still further to FIGS. 8-16, the electromagnet 318 can induce motion of the retention structure 202 such that the retention structure 202 is moved between the raised and lowered positions. The movement induced by the electromagnet 318 of the tractor assembly 258 is indirect. That is, no direct physical contact is made between the tractor assembly 258, the electromagnet 318, and the retention structure 202. Additionally, no intermediate physical contact is made between the retention structure 202, the tractor assembly 258, and the electromagnet 318 by way of an intermediate portion of the track assembly 194, such as a cam or connecting member. Rather, the motion of the retention structure 202 induced by the electromagnet 318 to move the retention structure 202 from the raised to the lowered position is accomplished by a magnetic field selectively provided by the electromagnet 318. In operation, the tractor assembly 258 is actuated to a location along the rail assembly 98 where one of the carriage assemblies 122 is located. When the electromagnet 318 is activated, the magnetic field provided by the electromagnet 318 can cause the retention structure 202 to move the engagement ends 398 of the locking pawls 390 to the lowered or disengaged position relative to the recesses 386 such that the carriage assembly 122 can be actuated along the rail assembly 98. For example, the magnetic force provided by the electromagnet 318 can act against biasing members, such as lock springs 402, which bias the retention structure 202 to the raised or engaged position with the recesses 386. In various examples, the retention structure 202 can be made of a magnetically-susceptible material (e.g., steel) such that the magnetic field provided by the electromagnet 318 can attract the retention structure 202 toward the tractor assembly 258 and effect the disengagement of the engagement ends 398 from the recesses 386. The movement of the retention structure 202 between the raised and lowered positions is noted with arrow 406. Actuation of the retention structure 202 to the lowered or disengaged position permits actuation of the carriage assembly 122 along the rail assembly 98, as denoted with arrow 410. In some examples, the retention structure 202 may be made from a material that is not susceptible to a magnetic field. In such an example, the retention structure 202 can be provided with an insert 414 or a portion that is susceptible to magnetic fields. Accordingly, the electromagnet 318 can actuate the retention structure 202 by way of the insert 414 or magnetically susceptible portion.

Referring again to FIGS. 8-16, the carriage structure 126 can be at least partially made from a magnetically susceptible material (e.g., steel) or provided with an insert that is magnetically susceptible, similar to the example outlined above for the retention structure 202. When the electromagnet 318 is engaged below the carriage assembly 122, the carriage structure 126 can be indirectly coupled to the tractor assembly 258 that carries the engaged electromagnet 318. However, the carriage structure 126 does not vertically actuate relative to the rail assembly 98 due to the support provided by the upper rollers 358. Of course, it is contemplated that some degree of vertical movement of the carriage structure 126 may occur due to the activation of the electromagnet 318, however, this minor vertical movement can be restricted to the clearances provided between components of the carriage assembly 122. It is also contemplated that in many situations, the rail-mounted components 34 may have a sufficient amount of weight to result in the taking-up of tolerances between components of the carriage assembly 122 prior to, and independent of, activation of the electromagnet 318. While little to no vertical movement of the carriage structure 126 relative to the rail assembly 98 may occur as a result of the activation of the electromagnet 318, once the electromagnet 318 is activated and the magnetic field interacts with the carriage structure 126, then subsequent movement or actuation of the tractor assembly 258 relative to the rail assembly 98 is imparted to the carriage structure 126 and ultimately results in the actuation of the carriage assembly 122 along the rail assembly 98, as indicated by arrow 410.

Referring yet again to FIGS. 8-16, a method of coupling the carriage assembly 122 and the tractor assembly 258 to the rail assembly 98 will now be described according to one example. The carriage assembly 122 is aligned with an end of the rail assembly 98 such that the rail assembly 98 is generally collinear with a space between the carriage power brush assembly 338 and the carriage data brush assembly 342, as well as a space between the locking pawls 390 of the retention structure 202. In some examples, a portion of the locking rail 370 that is proximate a loading end of the rail assembly 98 can provide the recesses 386 as a continuous groove of the same or similar depth as the recesses 386 such that coupling of the carriage assembly 122 can be accomplished without compressing the lock springs 402. In such an example, the carriage assembly 122 can be coupled to the rail assembly 98 prior to the coupling of the tractor assembly 258 to the rail assembly 98 and without the exertion of additional energy by an assembler or by equipment used to compress the lock springs 402. Alternatively, during assembly, a magnetic field can be applied as the carriage assembly 122 is being coupled to the rail assembly 98 such that the retention structure 202 compresses the lock springs 402 and the carriage assembly 122 is free to slide along the rail assembly 98. The magnetic field in such an example may be provided by the tractor assembly 258 or by a piece of equipment utilized by the assembler. For example, an electromagnet that is separate from the tractor assembly 258 can be placed within the interior aperture 206 at the loading end of the rail assembly 98 and as the carriage assembly 122 is being aligned with the rail assembly 98, the electromagnet that is separate from the tractor assembly 258 can be utilized to compress the lock springs 402. It is also contemplated that the loading end of the rail assembly 98 can omit the locking rail 370 such that the engagement ends 398 of the locking pawls 390 slide within the locking rail channel 382 while the lock springs 402 remain in an extended position that corresponds with the raised position of the retention structure 202. Once the carriage assembly 122 has been assembled to the rail assembly 98, the tractor assembly 258 can be utilized to move the carriage assembly 122 along the rail assembly 98 to a desired location. Coupling the tractor assembly 258 to the rail assembly 98 can be done by aligning the tractor assembly 258 with the interior aperture 206 and compressing the guide member biasing member 306 such that the guide members 298 fit within the dimensions of the interior aperture 206. Next, the tractor assembly 258 can be inserted into the interior aperture 206 and ultimately engaged with the drive rack 282. In some examples, the protruding features 302 within the interior aperture 206 can taper toward the loading end of the rail assembly 98 such that the guide member biasing member 306 need not be compressed prior to inserting the tractor assembly 258 into the interior aperture 206. In such an example, as the tractor assembly 258 is actuated along the drive rack 282 along the rail assembly 98, the protruding features 302 can taper inward such that the guide members 298 are actuated toward one another and the guide member biasing member 306 is compressed.

Referring further to FIGS. 8-16, a method of operating the track assembly 194 will now be described according to one example. Once the tractor assembly 258 has been coupled to the rail assembly 98, the tractor assembly 258 can be utilized to adjust the position of one or more carriage assemblies 122 along the rail assembly 98. Once one of the carriage assemblies 122 has been coupled to the rail assembly 98, the tractor assembly 258 can be positioned below the carriage assembly 122 and the electromagnet(s) 318 can be engaged. The engagement of the electromagnet(s) 318 can transition the retention structure 202 from the raised position to the lowered position such that the engagement ends 398 disengage from the recesses 386 to an extent that permits actuation of the carriage assembly 122 along the rail assembly 98. The engagement of the electromagnet(s) 318 can also result in a magnetic coupling between the tractor assembly 258 and the carriage assembly 122 such that movement of the tractor assembly 258 along the rail assembly 98 results in corresponding movement of the carriage assembly 122 along the rail assembly 98. It is the magnetic coupling between the carriage assembly 122 and the tractor assembly 258 that enables the use of a slot-less approach to the rail assembly 98 while maintaining the ability to actuate rail-mounted components 34 to various locations within the cabin 90. The magnetic coupling also enables a contact-free actuation of the carriage assembly 122 along the rail assembly 98. The unlocking of the retention structure 202 and the magnetic coupling between the carriage assembly 122 and the tractor assembly 258 can occur simultaneously. Once the tractor assembly 258 has indirectly (e.g., magnetically) coupled with the carriage assembly 122, the tractor assembly 258 can actuate the carriage assembly 122 to the desired location along the rail assembly 98. Once the carriage assembly 122 has reached the desired location, the tractor assembly 258 can disengage the electromagnet(s) 318, which decouples the tractor assembly 258 from the carriage assembly 122 and allows the retention structure 202 to assume its raised or locked position with the engagement ends 398 entering one or more of the recesses 386. The tractor assembly 258 can then actuate to another location along the rail assembly 98 (e.g., back to the loading end) to similarly engage with another carriage assembly 122 to then actuate the next carriage assembly 122 to its associated desired location. Accordingly, each rail assembly 98 can be provided with a single tractor assembly 258 that is responsible for the adjustment of the positions of multiple carriage assemblies 122 coupled to the given rail assembly 98. In some examples, movement of the tractor assembly 258 in one rail assembly 98 can be synchronized with movement of the tractor assembly 258 in another rail assembly 98 to effect movement of rail-mounted components 34 that are coupled to a plurality of the rail assemblies 98 (e.g., storage units, lockers, consoles, seating assemblies, etc.).

Referring now to FIGS. 8-16, the carriage structure 126 can extend through the retention structure 202. For example, the retention structure 202 can define slots 418 that arms 422 of the carriage structure 126 extend through such that the carriage power and data brush assemblies 338, 342, which are carried by the arms 422, can engage with the carriage power conductor 226 and the carriage data conductor 234, respectively. Such an arrangement of the carriage assembly 122 enables continuous contact between the carriage power conductor 226 and the carriage power brush assembly 338, as well as the carriage data conductor 234 and the carriage data brush assembly 342, while permitting dynamic actuation of the retention structure 202 relative to the carriage structure 126. Additionally, the carriage structure 126 is able to provide a bearing surface for the retention structure 202 to act upon when the retention structure is actuated between the raised and lowered positions. The lock springs 402 can be positioned between a portion of the retention structure 202 and a portion of the carriage structure 126 such that the lock springs 402 are sandwiched between the two components. In some examples, the lock springs 402 may be positioned on or over a protrusion 426 that retains a lateral position of the lock springs 402 relative to the carriage assembly 122 as the lock springs 402 are actuated between compressed and extended positions. The protrusions 426 can be sized to fit within an inner diameter of the lock springs 402.

Figure 17:
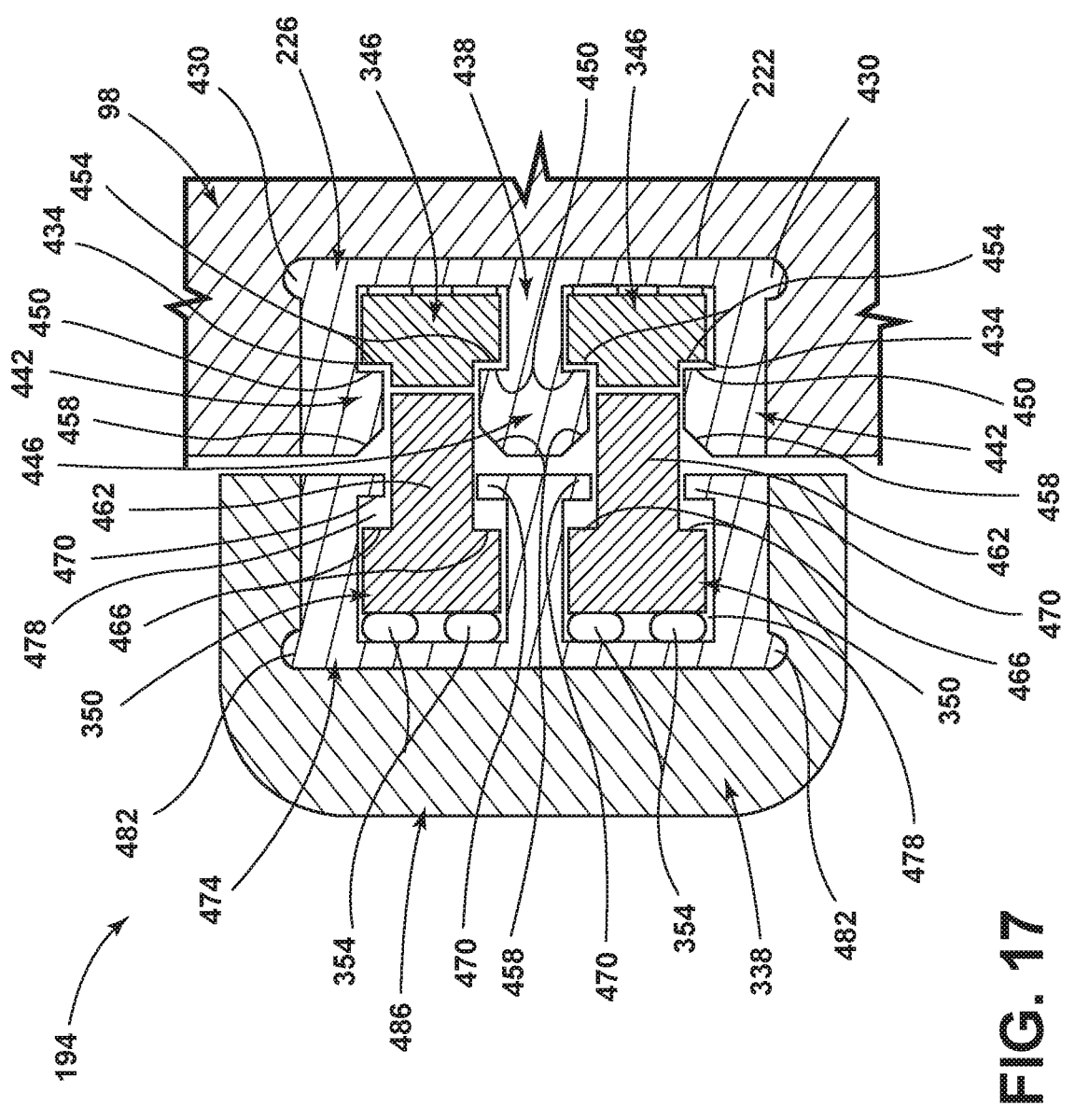

Referring to FIG. 17, the carriage power conductor 226 is received within the first external channel 222. The carriage power conductor 226 is provided with retention lips 430 that extend into corresponding portions of the first external channel 222 such that the carriage power conductor 226 is retained within the first external channel 222. The carriage power conductor 226 can be provided with a first thickness from which the retention lips 430 extend to define a second thickness that is greater than the first thickness. In the depicted example, the conductive members 346 are positioned within conductive member channels 434 that are defined by a body 438 of the carriage power conductor 226. The body 438 defines peripheral portions 442 that flank a central portion 446. The peripheral portions 442 and the central portion 446 each define one or more retaining protrusions 450 that aid in retention of the conductive members 346 within the conductive member channels 434. The retaining protrusions 450 on the peripheral portions 442 extend inwardly toward the central portion 446. Similarly, the retaining protrusions 450 on the central portion 446 extend outwardly toward the peripheral portions 442. The retaining protrusions 450 extend over shoulders 454 of the conductive members 346 such that an interference fit is provided between the retaining protrusions 450 and the shoulders 454. Accordingly, the conductive members 346 are retained within the conductive member channels 434 in directions that are non-parallel to a direction of travel of rail-mounted components 34 along the rail assembly 98. The peripheral portions 442 and the central portion 446 can include one or more tapered edges 458. The tapered edges 458 can aid in locating or receiving engagement portions 462 of the brushes 350 that are provided in the carriage power brush assembly 338. Said another way, upon misalignment of the brushes 350 relative to the conductive members 346, the engagement portion 462 of the brushes 350 may contact the tapered edges 458 of the peripheral and/or central portions 442, 446. In such a situation, the tapered edges 458 can aid in guiding the engagement portions 462 into contact with the conductive members 346 such that a connection is established between the carriage power brush assembly 338 and the carriage power conductor 226. The brushes 350 can include shoulders 466, similar to the shoulders 454 of the conductive members 346, which extend outwardly from a thickness of the engagement portion 462 of the brushes 350. Accordingly, the engagement portion 462 defines a first thickness of the brush 350 and the shoulders 466 define a second thickness of the brushes 350, where the second thickness is greater than the first thickness. Similar to the body 438 of the carriage power conductor 226, the carriage power brush assembly 338 can include retaining protrusions 470 that are defined by a body 474 of the carriage power brush assembly 338. The retaining protrusions 470 extend over the shoulders 466 of the brushes 350 such that the brushes 350 are retained within brush slots 478 that are defined by the body 474 of the carriage power brush assembly 338. The relative dimensions of the brushes 350 and the brush slots 478 can provide for actuation of the brush 350 relative to the associated brush slot 478. For example, the biasing members 354 in the carriage power brush assembly 338 can bias the brush 350 to an extended position such that the brush 350 is encouraged to actively engage with the conductive member 346 in the carriage power conductor 226. The engagement portion 462 of the brush 350 can have length that is longer than a length of the portion of the brush 350 that has the second thickness that defines the shoulders 466. Additionally, the brush slot 478 can be provided with dimensions that are greater than the length of the portion of the brush 350 that defines the shoulders 466. Accordingly, if the engagement portion 462 wears over time such that the length of the engagement portion 462 decreases as a function of time, the biasing members 354 can bias the brush 350 to the extended position such that the engagement portion 462 remains capable of contacting the conductive members 346. As with the body 438 of the carriage power conductor 226, the body 474 of the carriage power brush assembly 338 can define retention lips 482 that engage with a corresponding portion of a housing 486 of the carriage power brush assembly 338 such that the body 474 is retained within the carriage power brush assembly 338 in directions that are non-parallel to a direction of actuation along the rail assembly 98.

Figure 18:
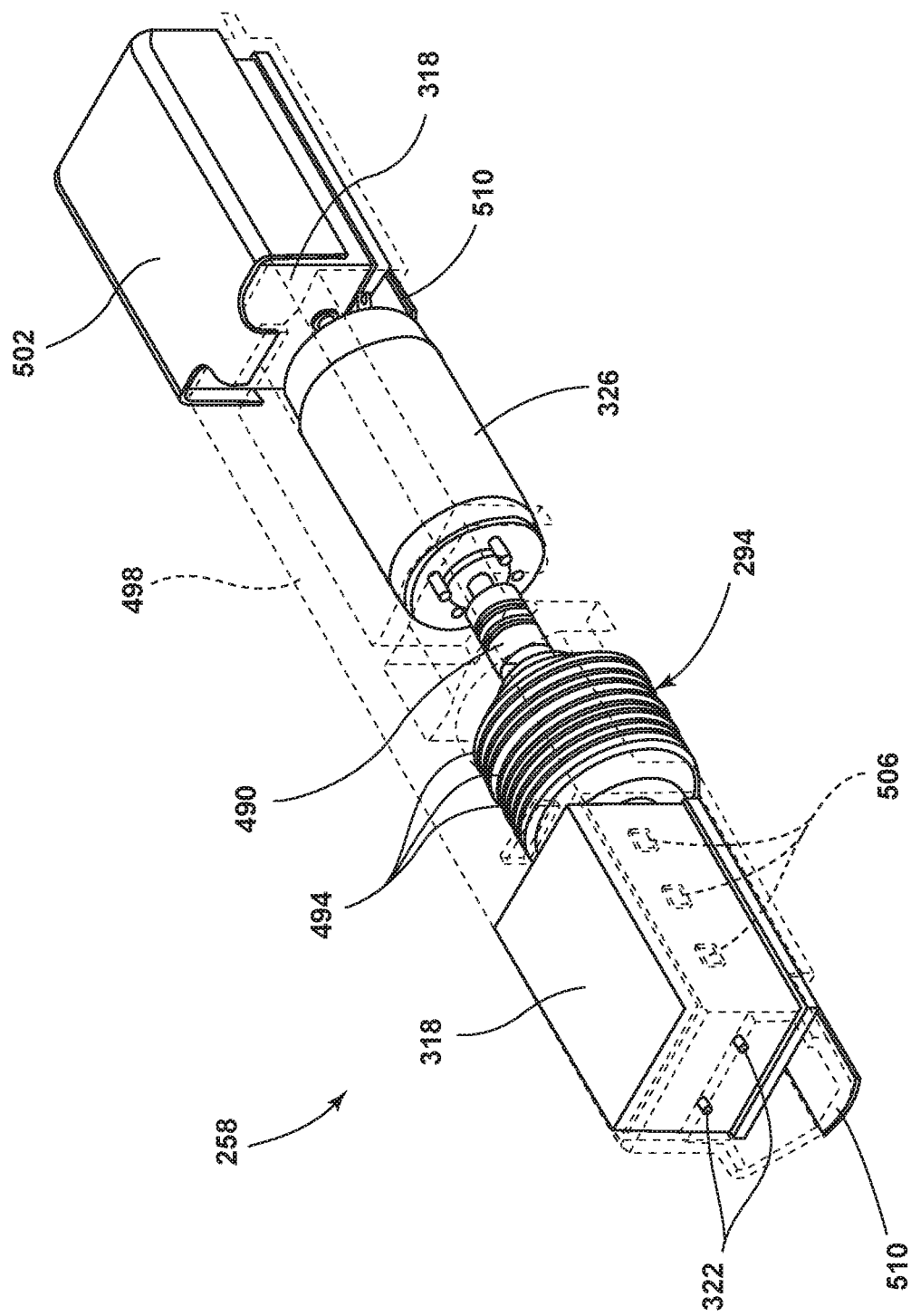
FIG. 18 is a side perspective view of the tractor assembly, illustrating components of the tractor assembly, according to one example.

Referring now to FIG. 18, in the depicted example, the tractor assembly 258 includes one or more of the electromagnets 318. In the depicted example, the electromagnets 318 are positioned proximate to ends of the tractor assembly 258 with the worm gear 294 and the drive motor 326 positioned between the electromagnets 318. The worm gear 294 and the drive motor 326 are coupled to one another by way of a drive shaft 490 that transmits rotational motion imparted by the drive motor 326 into rotational motion of the worm gear 294. The worm gear 294 and the drive motor 326 are rotatable in at least one of a clockwise and a counter-clockwise direction. In various examples, rotation of the worm gear 294 in one of the clockwise and the counter-clockwise direction results in actuation of the tractor assembly 258 in a first direction (e.g., forward) while rotation of the worm gear 294 in the other of the clockwise and the counter-clockwise direction results in actuation of the tractor assembly 258 in a second direction (e.g., rearward). The worm gear 294 is provided with teeth 494 that engage with the teeth 290 on the drive rack 282. The engagement between the teeth 494 on the worm gear 294 and the teeth 290 on the drive rack 282 enables the rotational motion imparted to the worm gear 294 by the drive motor 326 to be translated into linear motion of the tractor assembly 258 along the drive rack 282. The components of the tractor assembly 258 can be contained within a housing 498. The housing 498 can be provided with, or define, open regions that are positioned near the one or more electromagnets 318. These open regions in the housing 498 can receive a glide cap 502. The glide cap 502 can be coupled to the housing 498 with protrusions that engage with apertures 506 that are defined by the housing 498. Coupling the glide caps 502 to the housing 498 can be accomplished by pressing the glide caps 502 onto the housing 498 where the open regions are provided, at which point, the glide cap 502 can slightly and momentarily deform or expand. Once the protrusions provided on the glide cap 502 co-localize with the apertures 506 in the housing 498 of the tractor assembly 258, the glide cap 502 can reassume its designed shape while being retained to the housing 498 of the tractor assembly 258. Said another way, the slight and momentary deformation of the glide cap 502 can store an amount of restorative energy that is ultimately released upon the coupling of the protrusions with the apertures 506.

Referring again to FIG. 18, the glide cap 502 is made from a material that has a low coefficient of friction with the material of the rail assembly 98. The glide caps 502 are positioned over the electromagnets 318 such that the glide caps 502 contact the rail assembly 98 upon activation of the electromagnets 318 rather than the electromagnets 318 or the housing 498 of the tractor assembly 258. Upon activation of the electromagnets 318, the magnetic field provided by the electromagnets 318 results in an attractive force with at least a portion of the carriage assembly 122 (e.g., the retention structure 202 and/or the carriage structure 126). Accordingly, the tractor assembly 258 may be lifted within the interior aperture 206 such that direct physical contact is made with an underside of the top side 210 of the rail assembly 98. Therefore, the glide caps 502 provide a low-friction engagement between the tractor assembly 258 and the rail assembly 98 that does not impede actuation of the tractor assembly 258 along the interior aperture 206 of the rail assembly 98. In various examples, the glide caps 502 are removable such that as the material of the glide caps 502 wears over time, the glide caps 502 can be rapidly serviced and/or replaced. Additionally, the removable nature of the glide caps 502 can allow for utilization of the tractor assembly 258 in a variety of rail assemblies 98 that may be made from materials that have varying coefficients of friction relative to one another such that a single material choice for the glide caps 502 may not be optimal for each of the rail assemblies 98. Accordingly, different glide caps 502 can be interchanged based on the rail assembly 98 material that is present in a given configuration. In some examples, the housing 498 may be made of the material that the glide caps 502 would be made of such that the glide caps 502 may be omitted and the surface of the housing 498 may provide the decreased coefficient of friction with the underside of the top side 210 of the rail assembly 98. In such an example, tractor assemblies 258 with different materials for the housing 498 may be provided and/or utilized such that a sufficiently low coefficient of friction is provided between the tractor assembly 258 and the rail assembly 98. The teeth 494 on the worm gear 294 can be provided with a sufficient depth that, upon activation of the electromagnet(s) 318 and raising of the tractor assembly 258 within the interior aperture 206, the teeth 494 on the worm gear 294 do not become decoupled from the teeth 290 on the drive rack 282. The teeth 494 on the worm gear 294 extend from a portion of the housing 498. In some examples, the tractor assembly 258 can be provided with one or more glide bars 510. The glide bars 510 can carry a load or weight of the tractor assembly 258 such that components of the tractor assembly 258 do not stick or bind in the teeth 290 of the drive rack 282 while also providing a wear-resistant and low-friction engagement between the tractor assembly 258 and the drive rack 282. Said another way, the glide bars 510 can support the tractor assembly 258 on the drive rack 282 in a low-friction manner similar to the engagement of the glide caps 502 with the rail assembly 98. Additionally, the glide bars 510 carry and distribute the weight of the tractor assembly 258 such that the worm gear 294 does not carry vertical loads that result from the weight of the tractor assembly 258. Rather, the worm gear 294 carries loads along the direction of actuation (e.g., see arrow 410). Additionally, an amount of output torque required by the drive motor 326 may be decreased due to friction between the worm gear 294 and the drive rack 282 being decreased with the worm gear 294 not being pressed into the teeth 290 of the drive rack 282 by the weight of the tractor assembly 258.

Figure 19:
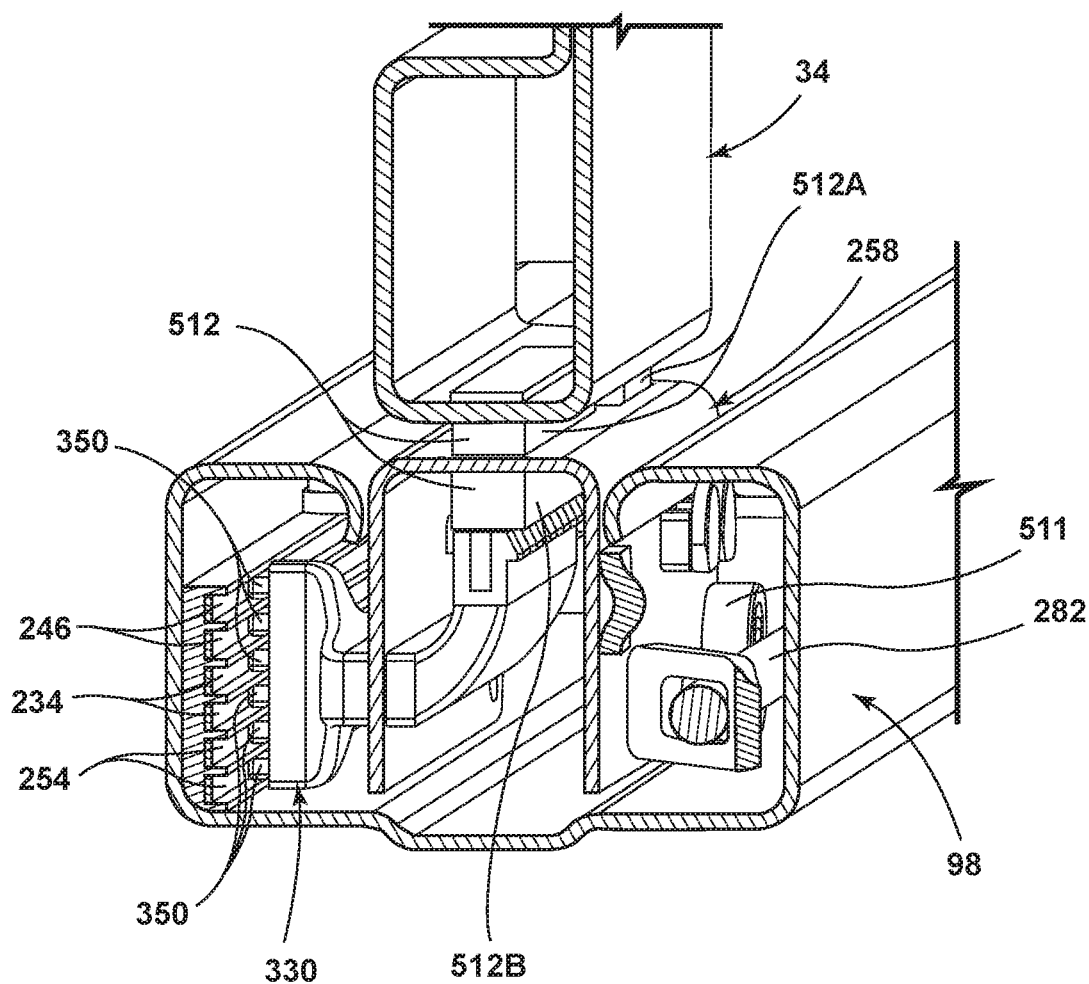
FIG. 19 is a cross-sectional view of the rail assembly, the tractor assembly, and the rail-mounted component, taken along line VIII-VIII of FIG. 7, illustrating one of the two track assemblies depicted in FIG. 7, according to one example.

Referring to FIG. 19, in various examples, the rail assembly 98 can be a slotted rather than a slot-less assembly. In such an example, the carriage assembly 122 may be omitted or incorporated into the tractor assembly 258. In the depicted example, the tractor assembly 258 can engage with a drive screw or the drive rack 282 of the rail assembly 98 (e.g., by way of the worm gear 294) to actuate the tractor assembly 258 relative to the rail assembly 98. The tractor assembly 258 in the depicted example may include rollers 511 that engage with the rail assembly 98 such that a coefficient of friction between the rail assembly 98 and the tractor assembly 258 is decreased when the tractor assembly 258 is being actuated relative to the rail assembly 98. The rail-mounted component 34 can establish a connection with the tractor assembly 258 that is capable of transferring power and/or data signals between components of the vehicle 30, components of the rail-mounted component 34, and/or components of the rail assembly 98. In various examples, the data signals can include, but are not limited to, rail-mounted component 34 position within the vehicle 30, inventory of monitored components (e.g., motors, actuators, restraints 42, etc.) provided on the rail-mounted component 34, and status of the monitored components provided on the rail-mounted component 34. The connection between the tractor assembly 258 and the rail-mounted component 34 can be accomplished with a connector 512. The connector 512 can be a quick-connect connector that enables rapid alignment and coupling between the rail-mounted component 34 and the tractor assembly 258. The connector 512 can include a rail-mounted component portion 512A and a tractor assembly portion 512B. The tractor assembly portion 512B of the connector 512 can be coupled to the brushes 350 of the tractor assembly 258. In the depicted example, the tractor power brush assembly 330 and the tractor data brush assembly 334 have been consolidated into a single brush assembly. Similarly, the rail assembly 98 has consolidated the carriage power conductors 226 and the tractor power conductors 246. The carriage data conductors 234 may remain and can be utilized to transmit and receive data signals that are communicated between the vehicle 30 and the rail-mounted component 34. The tractor data conductors 254 can perform similarly or identically to the tractor data conductors 254 discussed above. However, the various power and data conductors of the tractor assembly 258 and the carriage assembly 122 have been consolidated spatially within the rail assembly 98 in the depicted example.

Figure 20:
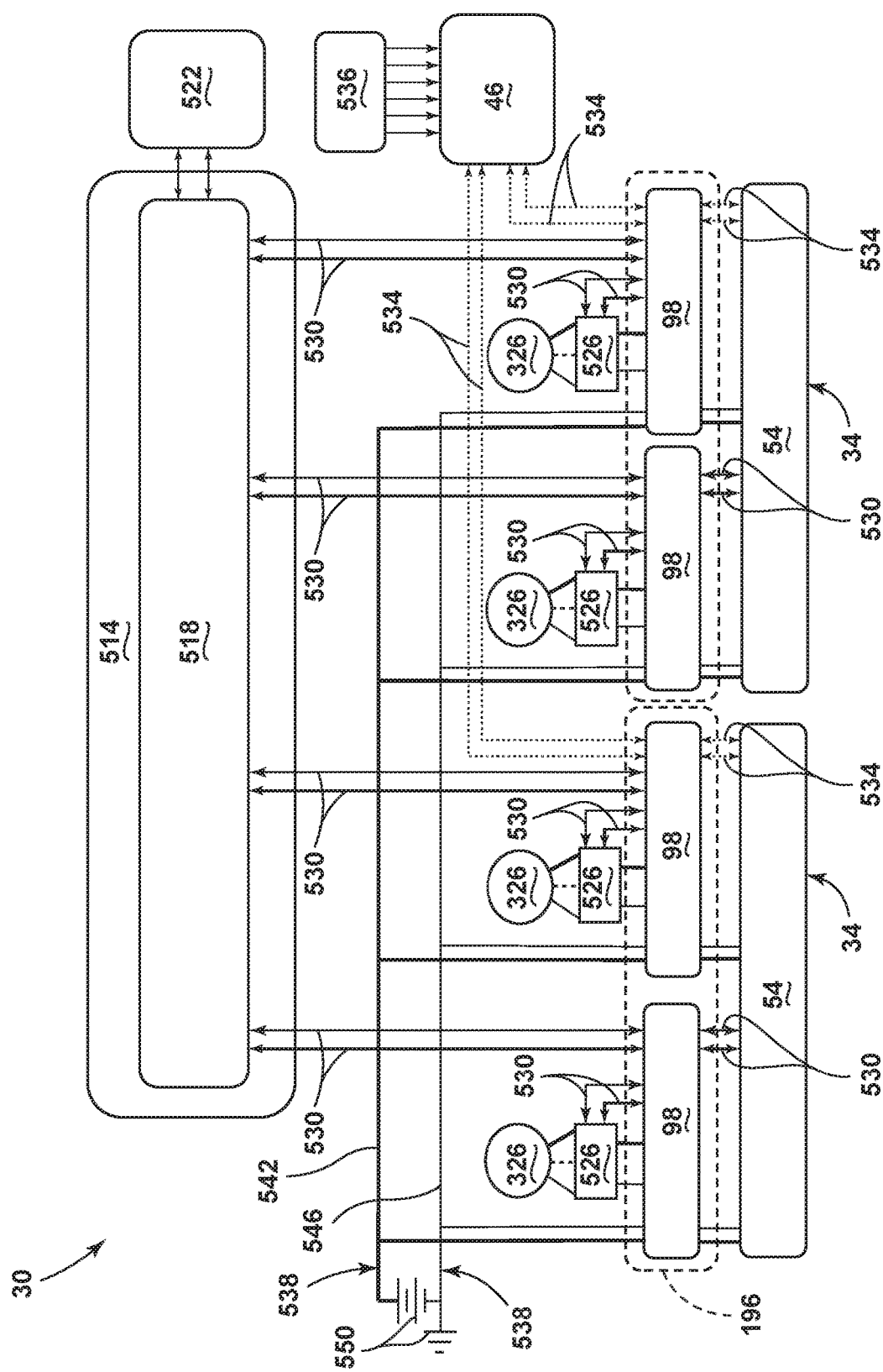
FIG. 20 is a schematic view of communication between the vehicle and the restraint monitoring system, according to one example.

Referring now to FIG. 20, communication between the vehicle 30 and the restraint monitoring system 38 is shown according to one example. Specifically, a vehicle control module 514 can be provided with a logic and message interface 518 that enables communication between a communication gateway 522 and the rail assemblies 98. In some examples, the communication gateway 522 may be an enhanced central gateway. The communication gateway 522 can enable communication between various modules, nodes, communication buses, and the like. Accordingly, the communication gateway 522 may facilitate data transfer and/or communication between various components of the vehicle 30 and/or the restraint control module 46. In examples, the communication gateway 522 can include a user interface where a user can select options for the rail-mounted component 34 and/or adjust setting of the rail-mounted component 34. For example, when the rail-mounted component 34 is one of the seating assemblies 94, the communication gateway 522 can be utilized to relay comfort adjustment requests, position adjustment along the rail assemblies 98 requests, and/or vehicle-based adjustment requests (e.g., entertainment adjustments, media volume adjustments, etc.). The logic and message interface 518 can be communicatively coupled to the rail assemblies 98. For example, the communicative coupling between the logic and message interface 518 and the rail assemblies 98 can be accomplished by way of a high-speed communication network. In one specific example, the high-speed communication network can be a Controller Area Network (CAN) bus. In various examples, the logic and message interface 518 can be hard-wired to the rail assemblies 98. For example, a physical conduit can extend between each of the rail assemblies 98 and the logic and message interface 518. Alternatively, the rail assemblies 98 and the logic and message interface 518 can communicate wirelessly. In some examples, the vehicle control module 514 may be the vehicle interface module 50. In various examples, the logic and message interface 518 may be the vehicle interface module microcontroller 62.

Referring again to FIG. 20, the rail assemblies 98 can also be communicatively coupled to a control and switch module 526. The rail assembly 98 and the associated control and switch module 526 can be communicatively coupled by way of the high-speed communication network. For example, the rail assembly 98 and the associated control and switch module 526 can be communicatively coupled by the CAN bus. The control and switch module 526 can be communicatively coupled to the drive motor 326 of the tractor assembly 258. Accordingly, functions of the control and switch module 526 can include, but are not limited to, communicating instructions from the vehicle 30 and/or a user to effect actuation of the tractor assembly 258 relative to the rail assembly 98. For example, the control and switch module 526 can register instructions from the vehicle 30 and/or the user to adjust a position of the rail-mounted component 34 along the rail assembly 98. The instructions registered by the control and switch module 526 can then be relayed to the drive motor 326 of the tractor assembly 258 to effect the desired adjustment. For example, the control and switch module 526 can store a current position of the tractor assembly 258 along the rail assembly 98 and can instruct the drive motor 326 to actuate the tractor assembly 258 the desired amount and in the desired direction along the rail assembly 98. In one specific example, the vehicle 30 and/or a user may actuate a switch (e.g., a seat-mounted positioning switch) that is associated with adjustment of a position of the tractor assembly 258 and/or the rail-mounted component 34 and in response to the actuated switch, the control and switch module 526 can relay instructions to the tractor assembly 258 (e.g., to the drive motor 326) to rotate the worm gear 294 in one of a clockwise and a counter-clockwise direction and to rotate the worm gear 294 through a calculated number of rotations to effect the desired degree of adjustment. While the control and switch module 526 is described as relaying or communicating instructions to the tractor assembly 258, one of skill in the art will recognize that such a relaying or communicating of instructions may take the form of a power signal that is provided with a defined duration that effects the desired degree of actuation of the tractor assembly 258 and/or the rail-mounted component 34. Said another way, the control and switch module 526 can receive the instructions from the vehicle 30 and/or the user, the control and switch module 526 can then interpret the received instructions, and the control and switch module 526 can then provide power to the drive motor 326 in a manner that effects the desired degree and direction of actuation of the tractor assembly 258.

Referring further to FIG. 20, a rail-mounted component controller can be communicatively coupled to the vehicle control module 514, the logic and message interface 518, the communication gateway 522, and/or the control and switch module 526 by way of the rail assembly 98. For example, the communicative coupling between the rail-mounted component controller, the vehicle control module 514, the logic and message interface 518, the communication gateway 522, and/or the control and switch module 526 can be established by an engagement of the brushes 350 of the carriage data brush assemblies 342 with the carriage data conductor(s) 234 of the rail assemblies 98. Communication between the rail-mounted component controller and the rail assembly 98 can be accomplished by way of the high-speed communication network, such as a CAN bus. For example, components of the rail-mounted component 34 (e.g., motors, restraints, heating assemblies, ventilation assemblies, etc.) can be coupled to one another as part of a rail-mounted component based CAN bus and the rail-mounted component based CAN bus can communicatively couple with a vehicle-based CAN bus by way of the engagement between the brushes 350 of the carriage data brush assemblies 342 and the carriage data conductors 234 of the rail assemblies 98. By so arranging the high-speed communication networks of the vehicle 30 and the rail-mounted component 34, a sliding communicative coupling can be provided between the rail assemblies 98 of the vehicle 30 and the rail-mounted components 34 that prevents wiring harnesses or wire bundles from becoming tangled during traversal events as the rail-mounted component 34 is actuated along the rail assembly 98. The various components of the vehicle 30 and the rail-mounted component 34 that are capable of communication along the high-speed communication network(s) can be coupled to one another by conduits 530. In various examples, the rail-mounted component controller may be the rail-mounted component control module 54 or a controller provided within the rail-mounted component control module 54.

Referring still further to FIG. 20, the restraint control module 46 can be communicatively coupled (e.g., hard-wired) to one of the rail assemblies 98 that makes up each of the track planks 196. For example, conduits 534 can extend between the restraint control module 46 and one of the rail assemblies 98 of the track planks 196. The brushes 350 of the carriage data brush assemblies 342 can engage with the carriage data conductors 234 of the rail assemblies 98 such that a communicative coupling is established between the rail-mounted component 34 and the restraint control module 46. The communicative coupling of the restraint control module 46 to the rail assemblies 98 and the ultimate communication between the restraint control module 46 and the rail-mounted component 34 can be maintained as a separate communication network from the remaining communication networks that are provided in the vehicle 30. Accordingly, the communication network of the restraint monitoring system 38 may be isolated from the remaining communication networks of the vehicle 30. Therefore, high-priority signals, such as restraint deployment signals, may be transmitted to the rail-mounted component 34 in a more direct manner than may otherwise be accomplished if the communication network of which the restraint monitoring system 38 is a part were not isolated form the remaining communication networks of the vehicle 30. The restraint deployment signals can be initiated by the restraint control module 46 receiving communication signals from one or more impact sensors 536. The impact sensors 536 can initiate or otherwise trigger the sending of the restraint deployment signals by the restraint control module 46 in the event that an impact or collision is sensed as imminent or the impact or collision has occurred. The communication network of which the restraint monitoring system 38 is a part can be a high-speed communication network. For example, a CAN bus may be utilized for communications within the restraint monitoring system 38. Power conduits 538 can extend between a vehicle-mounted power supply (e.g., one or more batteries) to the rail assemblies 98. For example, the power conduits 538 can extend from the vehicle-mounted power supply to each of the rail assemblies 98. The power conduits 538 can include positive voltage conduits 542 and negative voltage conduits 546 in various examples. The power conduits 538 may be coupled to a ground 550 that is common for the positive voltage conduits 542 and the negative voltage conduits 546. For example, the ground 550 may be a chassis ground such that the grounding of the power conduits 538 is a chassis of the vehicle 30. While some aspects of the present disclosure have been discussed relative to the carriage power conductor 226, the carriage data conductor 234, the carriage power brush assemblies 338, and/or carriage data brush assemblies 342, one of skill in the art will recognize that the same or similar aspects may apply to the tractor power conductor 246, the tractor data conductor 254, the tractor power brush assemblies 330, and/or the tractor data brush assemblies 334 depending on the example of the track assembly 194 being employed (e.g., slotted vs. slot-less), without departing from the concepts disclosed herein. Said another way, one of skill in the art will recognize that power and data signals are communicated between the vehicle 30 and the rail-mounted component 34 by way of the carriage power conductor 226, the carriage data conductor 234, the carriage power brush assemblies 338, and/or carriage data brush assemblies 342 in some examples, while in other examples, the tractor power conductor 246, the tractor data conductor 254, the tractor power brush assemblies 330, and/or the tractor data brush assemblies 334 accomplish the communication of the power and data signals between the vehicle 30 and the rail-mounted component 34.

Figure 21:
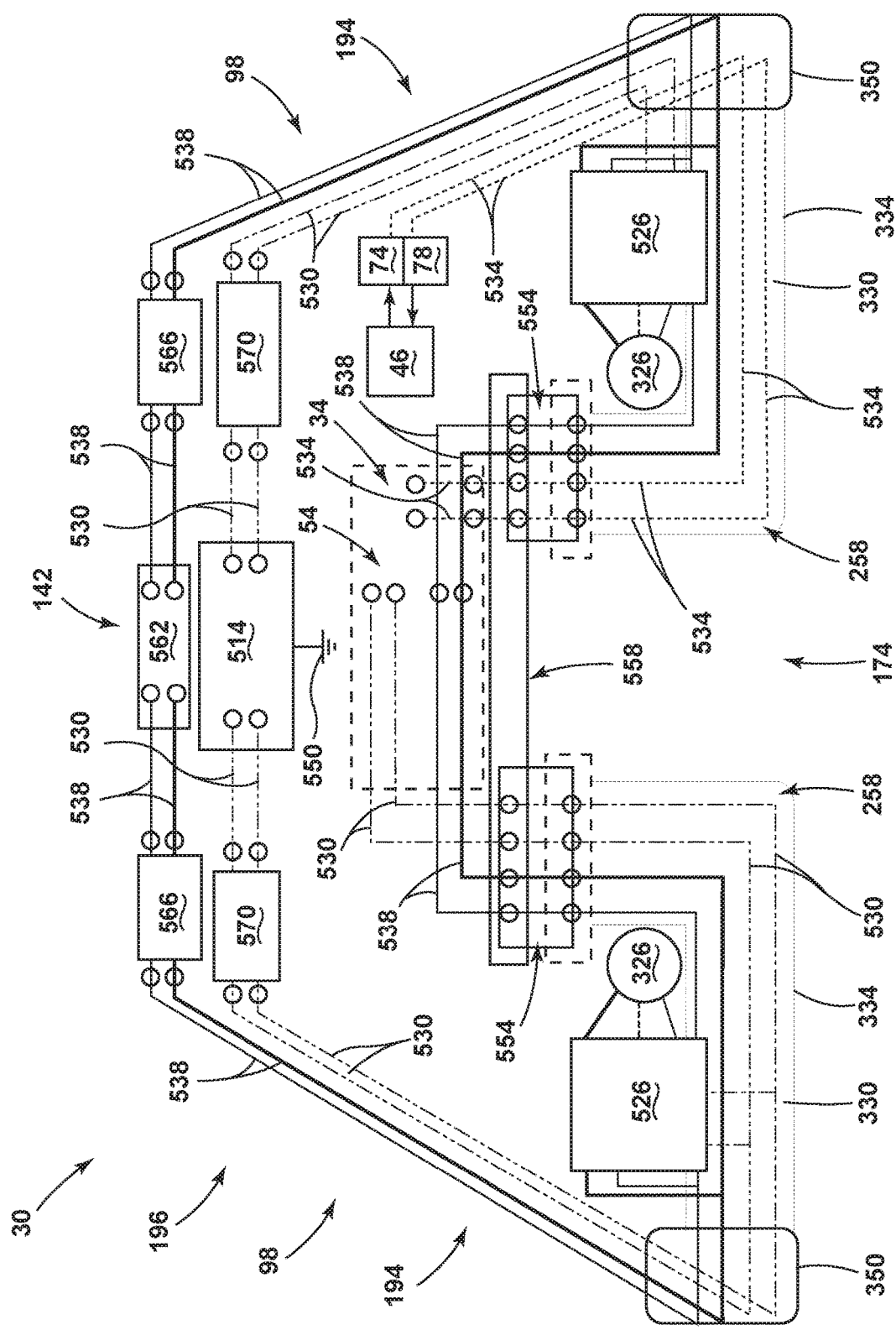
FIG. 21 is a schematic view of the vehicle, illustrating aspects of a communication network of the present disclosure with one of the rail-mounted components coupled to the track assemblies, according to one example.
Figure 22:
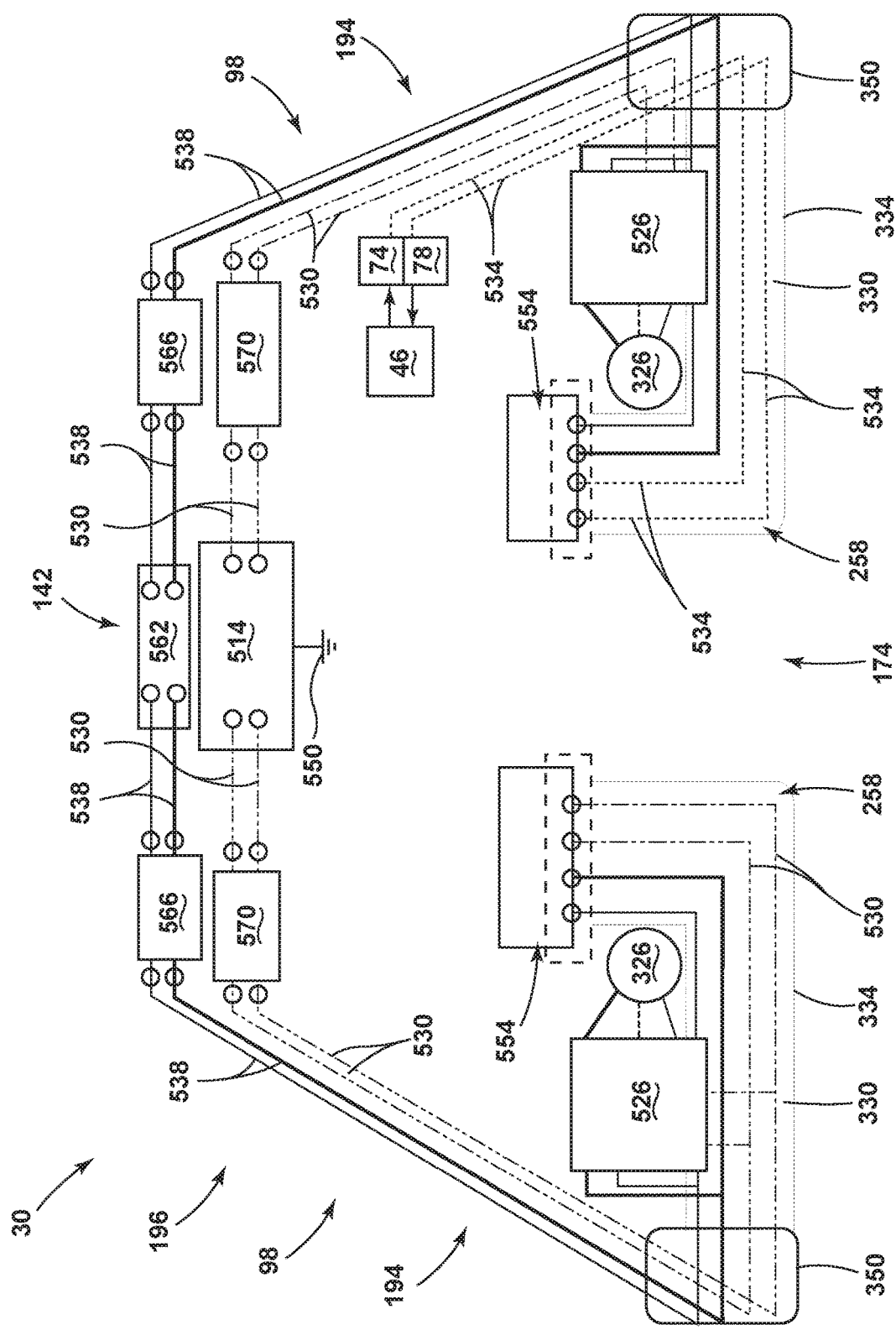
FIG. 22 is a schematic view of the vehicle, illustrating aspects of the communication network of the present disclosure, according to one example.

Referring to FIGS. 21 and 22, the rail assemblies 98 are schematically depicted with the conduits 530 that are part of the high-speed communication network, the conduits 534 that extend from the restraint control module 46 to the rail assemblies 98, the power conduits 538, the tractor assemblies 258, the brushes 350 of the tractor power brush assemblies 330, and the brushes 350 of the tractor data brush assemblies 334. Depicted is a pair of rail assemblies 98 or track assemblies 194 that are adjacent to one another and may be alternatively referred to as a track plank 196. The rail assemblies 98 each include one of the tractor assemblies 258. The drive motor 326 and/or the control and switch module 526 of each of the tractor assemblies 258 can be provided with a pulse generator that logs rotations of the drive motor 326 such that a current position of the given tractor assembly 258 can be known. Additionally, the pulse generator can be utilized to determine when to cease actuation of the tractor assembly 258 relative to the rail assembly 98. For example, the pulse generator can produce a square wave with known pulse durations and the pulse durations can correspond with a degree of rotation of the drive motor 326 (e.g., half of a revolution, a full revolution, etc.). Additionally, the extent of linear actuation of the tractor assembly 258 relative to the rail assembly 98 that corresponds with a single revolution of the drive motor 326 can be known. Accordingly, power may be provided to the drive motor 326 for a period of time and the extent of actuation of the tractor assembly 258 relative to the rail assembly 98 can be logged by the pulse generator. In one example, the pulse generator reports revolutions of the drive motor 326 to the control and switch module 526 by way of a generated pulse signal (e.g., a square wave), as indicated by the dashed line between the drive motor 326 and the control and switch module 526, and the control and switch module 526 monitors the number of pulses received to compare the received pulses with an expected number of pulses that correspond to the degree of actuation requested. Once the control and switch module 526 determines the desired degree of actuation has been attained, the control and switch module 526 can cease providing power to the drive motor 326 such that actuation of the tractor assembly 258 along the rail assembly 98 ceases.

Referring again to FIGS. 21 and 22, in the depicted example of FIG. 21, the rail-mounted component 34 is coupled to the adjacent rail assemblies 98 or track assemblies 194 that make up the track plank 196. Accordingly, the rail-mounted component 34 is supported by two of the rail assemblies 98. Therefore, to prevent binding or sticking of the tractor assemblies 258 within their respective rail assemblies 98, it can be beneficial to synchronize or otherwise coordinate movement of the tractor assemblies 258 that are paired by way of the rail-mounted component 34. In various examples, the pulse generator can be utilized as a reference by the control and switch module 526 to maintain synchronization between the tractor assemblies 258, monitor a degree of synchronization between the tractor assemblies 258, and/or correct the tractor assemblies 258 when the tractor assemblies 258 become out-of-synchronization. When the tractor assemblies 258 are registered as being unacceptably out-of-synchronization by the control and switch module 526, corrective measures can be taken to return the tractor assemblies 258 to an acceptable level of synchronization. Such corrective measures can include, but are not limited to, adjusting one or more of the tractor assemblies 258 toward the other of the tractor assemblies 258 along their respective rail assemblies 98 such that the tractor assemblies 258 become aligned within an acceptable level of synchronization in their positions relative to one another. In some examples, a linear transistor or a linear potentiometer may be utilized within the rail assembly 98 as a position interrogator that can be used to determine a position of the tractor assembly 258 within or along the rail assembly 98. Said another way, the present disclosure is not limited to the use of a pulse generator for interrogating or otherwise determining a position of the tractor assembly 258. Rather, alternative structures and/or assemblies may be utilized that can provide the control and switch module 526, the vehicle control module 514, and/or other components of the vehicle 30 with positional information for the tractor assemblies 258.

Referring further to FIGS. 21 and 22, the tractor assemblies 258 can be provided with a component connector 554 or component plug that receives a corresponding and complimentary tractor connector 558 or tractor plug. In various examples, the component connector 554 and the tractor connector 558 can be quick-connect connectors that rapidly and readily couple with one another. Examples of quick-connect connectors can include, but are not limited to, peripheral component interconnect (PCI) slots, peripheral component interconnect (PCI) express slots, male-to-female connectors, or any other suitable connectors that facilitate rapid alignment and coupling between the rail-mounted component 34 and the tractor assemblies 258. The coupling of the rail-mounted component 34 and the tractor assemblies 258 by way of the component connectors 554 and the tractor connector 558 can establish a communicative coupling between the rail-mounted component control module 54 and the rail assemblies 98, and ultimately various components of the vehicle 30. Upon coupling of the rail-mounted component 34 and the tractor assemblies 258 by way of the component connectors 554 and the tractor connector 558 communication between the restraint control module 46 and the restraints 42 that may be provided on the rail-mounted component 34 can be established. The restraint control module 46 can be provided with the restraint deployment loop 74 and the restraint diagnostic loop 78. Accordingly, upon the establishment of the communicative coupling between the restraint control module 46 and the rail-mounted component 34, any restraints 42 that are present on the rail-mounted component 34 can begin being monitored by the restraint control module 46. For example, the restraint control module 46 may take inventory of the restraints 42 that are provided on the rail-mounted component 34, the restraint control module 46 may poll, query, or otherwise check the health or deployability of the restraints 42, and/or the restraint control module 46 may otherwise perform diagnostic status inquiries or checks upon the restraints 42 to ensure their operability.

Referring still further to FIGS. 21 and 22, the tractor assemblies 258 are able to move along the rail assemblies 98 by activation or actuation of the drive motor 326. The tractor assemblies 258 can actuate in a fore-aft direction such that the tractor assemblies 258 travel along the rail assemblies 98 between the front 142 of the vehicle 30 and the rear 174 of the vehicle 30. As the tractor assemblies 258 traverse the rail assemblies 98, the brushes 350 maintain contact with the rail assemblies 258 such that power and/or data signals can be transmitted and/or received between the vehicle 30 and the rail-mounted component 34. The power signals or power voltage is supplied by the power conduits 538. The power signals or power voltage can be supplied by a vehicle-mounted power supply 562, such as a battery. The power conduits 538 can engage with the vehicle-mounted power supply 562 by way of a power connector 566 that is utilized to couple the rail assembly 98 to the vehicle-mounted power supply 562. The data signals are transmitted along the conduits 530 that are part of the high-speed communication network and/or the conduits 534 that are part of the coupling of the restraint control module 46 to the rail assemblies 98 and the rail-mounted component 34. The conduits 530 that are part of the high-speed communication network can be coupled to the vehicle control module (VCM) 514 by VCM connectors 570.

Figure 23:
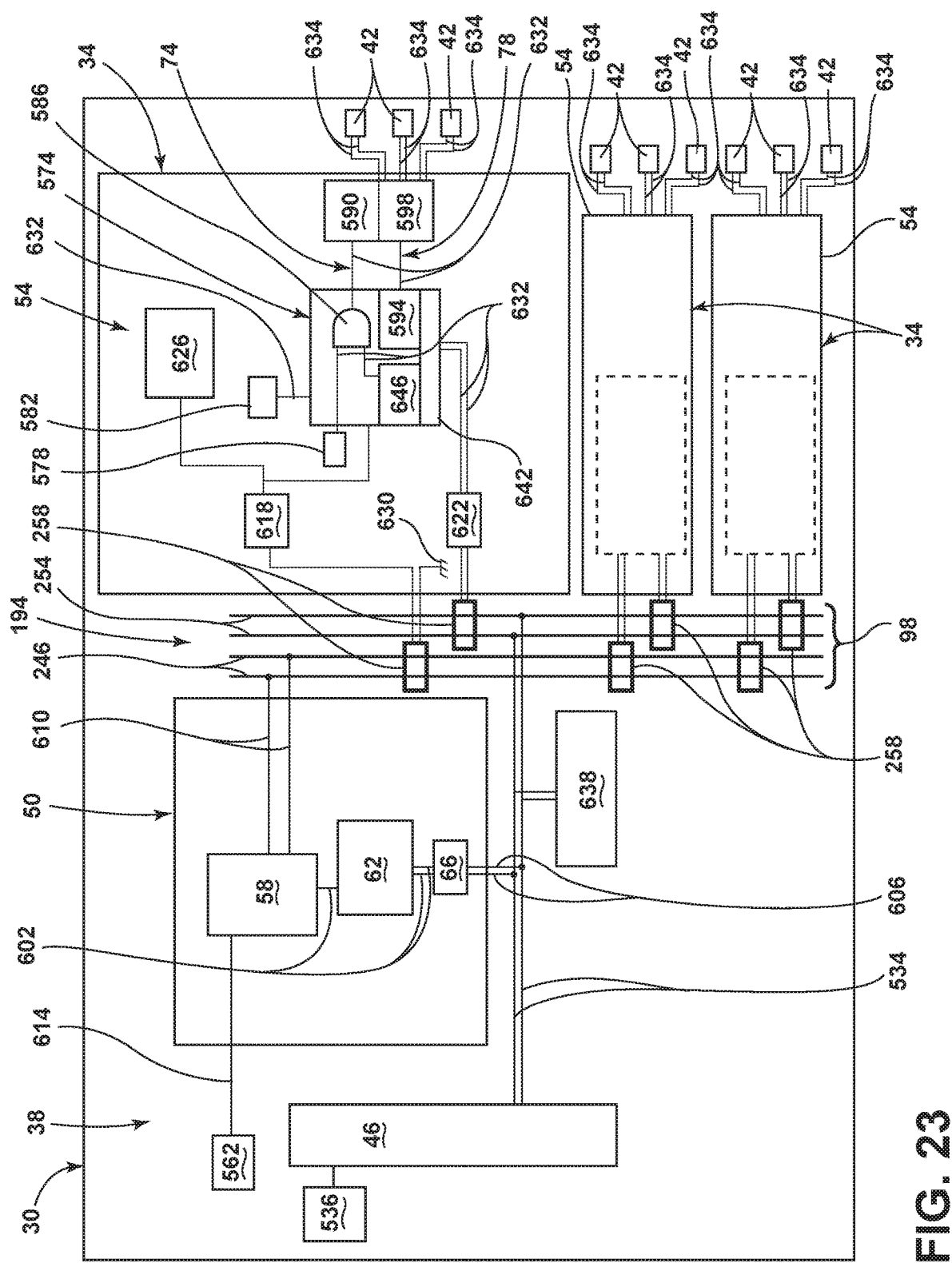
FIG. 23 is a schematic view illustrating various components of a restraint monitoring system, according to one example.

Referring now to FIG. 23, the vehicle 30 can be provided with the ability to receive one or more of the rail-mounted components 34. In various examples, the vehicle 30 may be provided with the one or more rail-mounted components 34. The vehicle 30 includes the restraint monitoring system 38. One or more of the one or more rail-mounted components 34 can be provided with the one or more restraints 42. In various examples, the restraints 42 can be seatbelts, airbags, tethers, or any other structure that restricts movement of a cargo item or a passenger. The restraint monitoring system 38 includes the restraint control module 46, the vehicle interface module 50, and the rail-mounted component control module 54. The vehicle interface module 50 can include the regulator module 58, the vehicle interface module microcontroller 62, and/or the peripheral sensor 66. In various examples, a rail-mounted component control module microcontroller 574 can communicate diagnostic status of one or more of the one or more restraints 42 to the restraint control module 46. For example, the rail-mounted component control module 574 can communicate the diagnostic status of one or more of the one or more restraints 42 to rail assembly 98 and the restraint control module 46 can receive the communicated diagnostic status from the rail assembly 98 by way of the conduits 534 that are coupled to the rail assembly 98. The restraint control module 46 can communicate the diagnostic issue to a user or operator of the vehicle 30. The rail-mounted component control module 54 can include the restraint deployment loop 74 and/or the restraint diagnostic loop 78. In various examples, the restraint deployment loop 74 can include the rail-mounted component control module microcontroller 574, an occupancy sensor 578, a buckle sensor 582, a logic gate 586, and/or a deployment control module 590. In some examples, the restraint diagnostic loop 78 includes a diagnostic interpreting module 594 and/or a diagnostic control module 598. The vehicle interface module 50 and the rail-mounted component control module 54 can each be positioned downstream of the restraint control module 46 and upstream of the one or more restraints 42.

Referring again to FIG. 23, the restraint control module 46 can receive impact signals from the one or more impact sensors 536 that are coupled to the vehicle 30. The impact sensors 536 may be existing impact sensors 536 that are already incorporated into the construction or architecture of the vehicle 30. For example, the impact sensors 536 may be, but are not limited to, accelerometers that register sudden accelerations and/or decelerations, piezoelectric sensors, piezoresistive sensors, strain gage sensors, radar, LIDAR, imagers, and/or combinations thereof. In general, the impact sensors 536 can be employed to determine when a change has occurred that warrants deployment of safety measures and/or the restraints 42. The impact sensors 536 can be utilized to determine an imminent impact event and/or an impact event. The term imminent impact is intended to encompass situations where impact with an object external to the vehicle 30 is likely and may or may not be avoidable with safety measures. For example, some imminent impacts may be avoidable with the application of a braking system. In such an example, the vehicle 30 may initiate safety measures in the form of braking. In some examples, some imminent impacts may not be avoidable due to various factors, at which point the restraints 42 and/or other safety measures may be enacted (e.g., seatbelt tensioners). In various examples, the vehicle 30 may enact measures to initiate avoidance of the imminent impact and escalate or transition into further safety measures and/or restraint 42 deployment upon determination of an impending impact or an actual impact. In examples, the one or more impact sensors 536 communicate the impact signal(s) to the restraint control module 46. Upon receipt of the impact signal(s) from the one or more impact sensors 536, the restraint control module 46 communicates a restraint deployment signal to the rail assembly 98 by way of the conduits 534. Next, the rail-mounted components 34 that are coupled to the rail assembly 98 receive the restraint deployment signal from the carriage data conductor 234 and/or the tractor data conductor 254. For example, the restraint deployment signal can be received by the rail-mounted component control module microcontroller 574. Upon receipt of the restraint deployment signal from the carriage data conductor 234 and/or the tractor data conductor 254, the rail-mounted component control module microcontroller 574 can communicate the restraint deployment signal to the one or more restraints 42. In some examples, the rail-mounted component control module microcontroller 574 can reference the occupancy sensor 578 to determine if the rail-mounted component 34 is occupied. In examples where the rail-mounted component 34 is one of the seating assemblies 94, the occupancy sensor 578 can be referenced to determine if a passenger or occupant is present in the seating assembly 94. Additionally or alternatively, in examples where the rail-mounted component is one of the seating assemblies 94, the buckle sensor 582 can be provided that is referenced by the rail-mounted component control module microcontroller 574 to determine if a passenger or occupant is present in the seating assembly 94. In examples where the rail-mounted component 34 is one of the storage units 158 or one of the storage compartments 162, the occupancy sensor 578 can be referenced to determine if a cargo item, such as a package or delivery item, is present in the given storage unit 158 or storage compartment 162. Additionally or alternatively, in examples where the rail-mounted component is one of the storage units 158 or one of the storage compartments 162, the buckle sensor 582 can be provided and referenced by the rail-mounted component control module microcontroller 574 to determine if a cargo item, such as a package or delivery item, is present in the given storage unit 158 or storage compartment 162. In such an example, the buckle sensor 582 may monitor a buckle receptacle or tie down that is utilized to secure one of the cargo items. When the rail-mounted component control module microcontroller 574 determines that the rail-mounted component 34 is occupied and the restraint deployment signal has been received, then the rail-mounted component control module microcontroller 574 can communicate the restraint deployment signal to one or more of the one or more restraints 42.

Referring further to FIG. 23, in various examples, the restraint monitoring system 38 monitors a health and/or operability of the one or more restraints 42 by way of the restraint diagnostic loop 78. The restraint diagnostic loop 78 can also monitor the health and/or operability of a communication network between the restraint control module 46 and the one or more restraints 42. The restraint control module 46 can poll, query, or otherwise monitor the health and/or operability of the one or more restraints 42 and/or the communication network of the restraint monitoring system 38. In various examples, the restraint control module 46 can send a diagnostic signal with predetermined or known characteristics to the rail-mounted component control module 54 through the rail assemblies 98, the restraints 42, and/or various other components of the restraint monitoring system 38. For example, the restraint control module 46 can send the diagnostic signal with a predetermined or known amplitude and/or time duration. In one specific example, the diagnostic signal may be sent by the restraint control module 46 at an amplitude of 110 milliamperes (mA) with a duration of 10 milliseconds (ms). The diagnostic signal may be sent on a regular basis to continually monitor the health and/or operability of the restraint monitoring system 38. For example, the diagnostic signal may be sent four times every second during a monitoring period. The monitoring period may be periodic or continual. In various examples, when the vehicle 30 is in park and power is available to the restraint monitoring system 38, the monitoring period may be periodic in nature and defined by timeframes of active diagnostic monitoring that are separated by timeframes that lack active diagnostic monitoring. For example, the periodic monitoring may actively monitor a diagnostic state of the restraint monitoring system 38 every minute, every other minute, or another timing interval that is greater than a traversal time of the diagnostic signal through the restraint monitoring system 38. In some examples, the monitoring period may be continual in nature such that active diagnostic monitoring is performed continually and at shorter time intervals than those indicative of the periodic monitoring. For example, the continual monitoring may be carried out several times every second while the vehicle 30 is not in park and power is available to the restraint monitoring system 38 (e.g., while the vehicle 30 is traveling on a road, while the vehicle is stopped at a traffic light, etc.).

Referring still further to FIG. 23, in examples that include the vehicle interface module 50, the vehicle interface module 50 can include, but is not limited to, the regulator module 58, the vehicle interface module microcontroller 62, and/or the peripheral sensor interface 66. The components of the vehicle interface module 50 can be coupled to one another by conduits 602. The conduits 602 can be electrically conductive wires that are capable of transmitting signals, such as electrical signals, between various components of the vehicle interface module 50 and/or the various components of the restraint monitoring system 38. In some examples, communication and/or transmission of signals between the vehicle interface module 50, the rail-mounted component control module 54, the restraint monitoring system 38, components of the vehicle interface module 50, components of the rail-mounted component control module 54, and/or components of the restraint monitoring system 38 can be accomplished by way of wireless communication for at least some of the components of the vehicle interface module 50 and/or the restraint monitoring system 38. For example, rather than employing the carriage data brush assemblies 342, the carriage data conductor 234, the tractor data brush assemblies 334, and/or the tractor data conductor 254, the various modules and components of the restraint monitoring system 38 can communicate wirelessly with one another for restraint diagnostic and restraint deployment purposes. Accordingly, the various conduits that delineate communication paths within the restraint monitoring system 38 can be omitted in some examples and the corresponding communication between previously wired components can be accomplished by way of wireless communication. Such an arrangement may be beneficial in simplifying the overall architecture of the restraint monitoring system 38 and decreasing wiring complexity between the associated components.

Referring again to FIG. 23, in various examples, communication signals transmitted and/or received by the vehicle interface module microcontroller 62 and/or the restraint control module 46 can be accomplished by way of a high-speed communication network. For example, the high-speed communication network can be a high-speed Controller Area Network (CAN) bus. The high-speed communication network can be coupled to various components of the vehicle interface module 50, components of the restraint monitoring system 38, and/or components of the vehicle 30. The restraint monitoring system 38, the restraint control module 46, the vehicle interface module 50, and/or the rail-mounted component control module 54 can be referred to as nodes of the high-speed communication network. The vehicle interface module 50 can be coupled to the restraint control module 46 by conduits 606 that extend from the vehicle interface module 50 to the conduits 534 that couple the restraint control module 46 to the rail assembly 98. Similarly, the vehicle interface module 50 can be coupled to the rail assembly 98 by one or more conduits 610. In some examples, the conduits 606 of the vehicle interface module 50 that couple to the conduits 534 that extend between the restraint control module 46 and the rail assembly 98 can transmit and/or receive data signals. For example, the conduits 606 of the vehicle interface module 50 can extend between the peripheral sensor interface 66 of the vehicle interface module 50 to communicatively couple the peripheral sensor interface 66 to the conduits 534, and ultimately data signals transmitted and/or received by the restraint control module 46. The conduits 534 that extend between the restraint control module 46 and the rail assembly 98 can be coupled to the carriage data conductor 234 and/or tractor data conductor 254. In various examples, the conduits 610 that extend between the vehicle interface module 50 and the rail assembly 98 can couple the vehicle interface module 50 to the carriage power conductor 226 and/or the tractor power conductor 246. For example, the conduits 610 that extend between the vehicle interface module 50 and the rail assembly 98 can couple the regulator module 58 to the carriage power conductor 226 and/or the tractor power conductor 246. Accordingly, voltage and/or current obtained from the vehicle-mounted power supply 562 can be limited or otherwise decreased to a preferable range for the components that receive voltage and/or current from the rail assembly 98. The vehicle-mounted power supply 562 can be coupled to the vehicle interface module 50 (e.g., directly coupled to the regulator module 58) by one or more conduits 614.

Referring yet again to FIG. 23, the rail-mounted component control module 54 can be communicatively coupled to the rail assembly 98 with which the given rail-mounted component 34 is associated. For example, the rail-mounted component control module 54 can be mounted to the rail-mounted component 34 and upon coupling the rail-mounted component 34 to one or more of the rail assemblies 98, the rail-mounted component control module 54 can establish a communicative connection with the restraint control module 46 and/or other components of the restraint monitoring system 38 by way of the rail assembly 98. Components of the rail-mounted component control module 54 can include, but are not limited to, the rail-mounted component control module microcontroller 574, the occupancy sensor 578, the buckle sensor 582, the deployment control module 590, the diagnostic control module 598, a power regulator 618, and/or a peripheral sensor interface 622 (e.g., PSI5). In various examples, the peripheral sensor interface 622 and the associated conduits that couple the peripheral sensor interface 622 to the rail-mounted component control module microcontroller 574 can provide a common output or return path for the restraint deployment loop 74 and the restraint diagnostic loop 78. Said another way, the restraint deployment loop 74 and the restraint diagnostic loop 78 can provide feedback to the rail assembly 98 and/or the track assembly 194 by way of the peripheral sensor interface 622. In the depicted example, the common output path or return path of the restraint deployment loop 74 and the restraint diagnostic loop 78 can be used to provide feedback or otherwise communicate with the restraint control module 46. More specifically, the common return path of the restraint deployment loop 74 and the restraint diagnostic loop 78 that is provided by the peripheral sensor interface 622 is coupled to the restraint control module 46 by way of the rail assembly 98 and the conduits 534. The rail-mounted component control module 54 is coupled to one or more of the one or more restraints 42 that are associated with the rail-mounted component 34. The power regulator 618 provided on the rail-mounted component 34 can regulate the voltage and/or current picked up from the rail assembly 98 to ensure the voltage and/or current does not exceed thresholds for the various components of the rail-mounted component 34 (e.g., various comfort/convenience features 626, the rail-mounted component control module microcontroller 574, etc.). The power regulator 618 can be a local voltage and/or current regulator that is provided on the rail-mounted component 34. The power regulator 618 can be coupled to the carriage power conductor 226 and/or the tractor power conductor 246 such that power received from the carriage power conductor 226 and/or the tractor power conductor 246 can be provided to the various components of the rail-mounted component 34. The power regulator 618 can be coupled to a grounding terminal 630. In the depicted example, the grounding terminal 630 is a frame or chassis terminal that provides a ground reference point. In various examples, the vehicle-mounted power supply 562 can be one or more batteries provided by the vehicle 30 and the power from the one or more batteries can be carried by the carriage power conductors 226 and/or the tractor power conductors 246.

Referring further to FIG. 23, the rail-mounted component control module microcontroller 574 can include the logic gate 586 that is coupled to the occupancy sensor 578. In various examples, the logic gate 586 is an AND gate that transmits the deployment signal to the restraints 42 when the deployment signal is present and when the occupancy sensor 578 indicates the given rail-mounted component 34 is occupied (e.g., passenger or cargo item). As with the vehicle interface module 50, the components of the rail-mounted component control module 54 can be coupled to one another by conduits 632. Similarly, the rail-mounted component control module 54 can be coupled to the one or more restraints 42 by conduits 634. In one example, the rail assemblies 98 enable vehicle-mounted components, which may include the impact sensors 536, the restraint control module 46, the vehicle interface module 50, and/or additional features 638 to communicate with components that are provided on the rail-mounted components 34. The carriage assemblies 122 and/or the tractor assemblies 258 can receive and/or transmit data signals, such as the restraint deployment signals and restraint diagnostic signals. Additionally, the carriage assemblies 122 and/or the tractor assemblies 258 can receive power signals from the vehicle-mounted power supply 562 by way of the rail assemblies 98.

Referring again to FIG. 23, once the restraint control module 46 has determined deployment of one or more of the restraints 42 is warranted, the restraint control module 46 can emit or otherwise communicate the restraint deployment signal to the rail assemblies 98. The restraint deployment signal can be a precisely defined signal that is detected or otherwise recognized by the rail-mounted component control module(s) 54. Additionally, the restraint deployment signal can be encoded by the restraint control module 46 and decoded by the rail-mounted component control module 54. In some examples, the restraint control module 46 may output the restraint deployment signal in a redundant fashion such that the rail-mounted component control module 54 relays the restraint deployment signal to the one or more restraints 42 when the rail-mounted component control module 54 has received both of the redundant restraint deployment signals. For example, the restraint control module 46 can transmit a first restraint deployment signal (e.g., 123456) and a second restraint deployment signal (e.g., 654321). The rail-mounted component control module 54 can "look" or otherwise respond to the precisely defined signal output by the restraint control module 46 such that signals that do not fit the criteria of the precisely defined signal output by the restraint control module can be excluded by the rail-mounted component control module 54. The signals that do not fit the criteria of the precisely defined signal output by the restraint control module 46 and ultimately recognized by the rail-mounted component control module 54 can arise from extraneous noise. The rail-mounted component control module microcontroller 574 and/or the peripheral sensor interface 622 can be responsible for interpreting incoming signals from the rail assembly 98.

Referring still further to FIG. 23, a response of the restraint monitoring system 38 as a result of a detected impact or a detected imminent impact will now be discussed according to one specific example. One or more of the one or more impact sensors 536 determine, sense, or otherwise detect that an impact has occurred or that an impact is imminent that warrants deployment of one or more of the restraints 42. Alternatively, the restraint control module 46 can interpret or otherwise analyze the signals provided by the one or more impact sensors 536 and determine that the impact or the imminent impact meets the criteria for deployment of one or more of the restraints 42. Regardless, the restraint control module 46 receives the impact signals from the one or more impact sensors 536 and can communicate the restraint deployment signal to the rail assembly 98 by way of the conduits 534. The rail assembly 98 then communicates the restraint deployment signal to the rail-mounted component control module 54. Said another way, the rail assembly 98 transmits the restraint deployment signal along a length of the rail assembly 98 and rail-mounted components 34 that are coupled to the rail assembly 98 can receive or pick-up the transmitted restraint deployment signal. The tractor assembly 258 of the rail-mounted component 34 then receives the restraint deployment signal. The restraint deployment signal pass through the peripheral sensor interface 622 and is transmitted to the rail-mounted component control module microcontroller 574 by the conduits 632. Upon entering the rail-mounted component control module microcontroller 574, the restraint deployment signal can pass through a high-speed communication network interface 642 (e.g., CAN bus interface). The rail-mounted component control module microcontroller 574 can include a deployment request module 646 that receives the restraint deployment signal. The logic gate 586 can receive the restraint deployment signal and the logic gate 586 can reference at least one of the occupancy sensor 578 and the buckle sensor 582 in determining whether the rail-mounted component 34 is occupied (e.g., passenger or cargo item). When the logic gate 586 determines that the rail-mounted component 34 is occupied and that the restraint deployment signal has been received, the restraint deployment signal can be advanced or transmitted to the deployment control module 590. Accordingly, the high-priority restraint deployment signal may be communicated to each of the rail-mounted components 34 within the vehicle 30 and only those rail-mounted components 34 that are deemed occupied may proceed with restraint deployment. The deployment control module 590 can communicate the high-priority restraint deployment signal to the one or more restraints 42 of the occupied rail-mounted component 34. Finally, the one or more restraints 42 receive the high-priority restraint deployment signal and initiate deployment of the restraint(s) 42. The deployment control module 590 can provide the output stages or the final steps in the restraint deployment loop (e.g., the final conveyance of the restraint deployment signal). For example, the deployment control module 590 can provide the deployment pulse or deployment energy that initiates the deployment of the one or more restraints 42 that are associated with the given deployment control module 590.

Referring yet again to FIG. 23, the diagnostic interpreting module 594 and/or the diagnostic control module 598 can be provided with diagnostic circuitry that is responsible for monitoring the diagnostic state or diagnostic health of the restraints 42 that are associated with the given rail-mounted component 34 and/or restraint diagnostic loop 78. In various examples, the restraint control module 46 can periodically transmit a status request message or status request communication along the high-speed communication network that is dedicated to the restraint monitoring system 38. Upon receipt of the status request message or communication, each of the rail-mounted component control modules 54 can respond to the restraint control module 46 with a status for the associated rail-mounted component 34. Statuses of the rail-mounted components 34 can include, but are not limited to, occupancy, buckle status, fault status, and/or deployment status. For each of the periodic monitoring cycles performed by the restraint control module 46, the restraint control module 46 can verify a number of rail-mounted components 34 that are responding to the status request message or communication and ensure the expected number of rail-mounted components 34 matches the number of rail-mounted components 34 that are responding to the status request message or communication. Additionally or alternatively, for each of the periodic monitoring cycles performed by the restraint control module 46, the restraint control module 46 can verify that the responding rail-mounted components 34 are fault-free or provide an indication that the restraints 42 remain operable and ready to receive a restraint deployment signal. In the event that a fault or diagnostic issue is detected and reported by one or more of the rail-mounted component control modules 54, then the restraint control module 46 can provide indication of the fault or diagnostic issue by illuminating a user-notification display (e.g., a restraint warning light, a human-machine interface (HMI), etc.). Similarly, in the event that the number of responding rail-mounted components 34 does not match the expected number of rail-mounted components 34, then the restraint control module 46 can provide indication of the mismatch between the expected and responding rail-mounted components 34 by illuminating the user-notification display (e.g., the restraint warning light, the human-machine interface (HMI), etc.).

In various examples, the present disclosure provides a rail assembly 98 and/or track assembly 194 that receives one or more of the rail-mounted components 34 while maintaining communicative coupling of the various components of the restraint monitoring system 38. The communicative coupling between the rail-mounted component 34 and the rail assembly 98 can be accomplished in a manner that prevents wiring harnesses, wire bundles, and the like from intruding into a travel path of the rail-mounted component 34 as the rail-mounted component 34 traverses the rail assembly 98. Rather, the communicative coupling between the rail-mounted component 34 and the rail assembly 98 is established by a sliding contact between conductors on the rail assembly 98 (e.g., the carriage power conductor 226, the carriage data conductor 234, the tractor power conductor 246, and/or the tractor data conductor 254) and brushes 350 on the carriage assembly 122 and/or the tractor assembly 258 (e.g., the tractor power brush assembly 330, the tractor data brush assembly 334, the carriage power brush assembly 338, and/or the carriage data brush assembly 342). Accordingly, a risk of tangling or the wires and/or conduits that might have otherwise been used in the absence of the sliding contact provided in the present disclosure can be avoided. Additionally, a wire or conduit "keeper" that takes-up slack in the wires or conduits as the rail-mounted component 34 traverses the rail assembly 98 can be avoided as such structures may break, bind, become misaligned, or otherwise become inoperable and result in the undesirable tangling of the wires or conduits. Instead, the present disclosure provides a compact and/or consolidated communicative coupling between the rail-mounted component 34 and the rail assembly 98 such that directly wiring (e.g., hard-wiring) the various components of the rail-mounted component 34 to the various components of the vehicle 30 is avoided, thereby enabling a greater degree of freedom for the movement of the rail-mounted component 34 along the rail assembly 98 and/or within the cabin 90 of the vehicle 30. For example, the rail-mounted component 34 may be capable of movement along the rail assembly 98 of up to one meter (1 m), up to two meters (2 m), up to three meters (3 m), or up to four meters (4 m). In various examples, the rail-mounted component 34 may be capable of movement along an entirety of a length of the rail assembly 98, movement along the rail assembly 98 of up to ninety-percent (90%) of the length of the rail assembly 98, movement along the rail assembly 98 of up to eighty-percent (80%) of the length of the rail assembly 98, movement along the rail assembly 98 of up to seventy-percent (70%) of the length of the rail assembly 98, movement along the rail assembly 98 of up to sixty-percent (60%) of the length of the rail assembly 98, and/or combinations or ranges thereof. The high-speed communication network (e.g., CAN bus) enables the communicative coupling between the various components of the vehicle 30 and the various components of the rail-mounted component 34. Additionally, the high-speed communication network is capable of distributing a high volume of communication. Accordingly, the high-speed communication network enables a decrease in physical wiring and/or conduits that may have otherwise prevented the degree of freedom of movement of the rail-mounted component 34. In various examples, the communications transmitted along the high-speed communication network may be assigned a priority level (e.g., high priority vs. low priority). For example, restraint deployment signals may be assigned a high priority level while comfort or convenience adjustments to the rail-mounted component 34 may be assigned a low priority level. Accordingly, high priority and low priority communications may be transmitted along the high-speed communication network without preventing the high priority communications from reaching their intended recipient (e.g., the restraints 42).

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle, comprising:
  a rail assembly:
  a rail-mounted component having one or more restraints, wherein the rail-mounted component is received by the rail assembly such that the rail-mounted component is slidably coupled with the rail assembly; and
  a restraint monitoring system, the restraint monitoring system comprising:
  a restraint control module;
  a vehicle interface module, the vehicle interface module comprising a vehicle interface module microcontroller that communicates data signals between the rail-mounted component and the vehicle, wherein the data signals communicated between the rail-mounted component and the vehicle are at least one signal chosen from a rail-mounted component position within the vehicle, an inventory of monitored components provided on the rail-mounted component, and a status of the monitored components provided on the rail-mounted component; and
  a rail-mounted component control module, wherein the rail-mounted component control module comprises a restraint deployment loop and a restraint diagnostic loop; and
  a high-speed communication network embedded within the rail assembly, wherein the high-speed communication network is dedicated to communications between the restraint control module and the rail-mounted component control module, and wherein the high-speed communication network is isolated from other communication networks within the vehicle.

2. The vehicle of claim 1, wherein the vehicle interface module comprises a regulator module.

3. The vehicle of claim 2, wherein the regulator module is coupled to a vehicle-mounted power supply and the rail assembly of the vehicle.

4. The vehicle of claim 3, wherein the regulator module limits at least one of a voltage and a current that is supplied to the rail assembly by the vehicle-mounted power supply.

5. The vehicle of claim 1, wherein the high-speed communication network is a high-speed CAN bus.

6. The vehicle of claim 1, wherein the restraint control module communicates a restraint deployment signal directly to the rail assembly.

7. The vehicle of claim 6, wherein the restraint deployment signal is transmitted from the rail assembly to the rail-mounted component control module by way of the high-speed communication network.

8. The vehicle of claim 7, wherein the restraint deployment signal is received by a rail-mounted component control module microcontroller located on the rail-mounted component.

9. The vehicle of claim 8, wherein the rail-mounted component control module microcontroller references an occupancy sensor to determine if the rail-mounted component is occupied.

10. The vehicle of claim 9, wherein upon determination by the rail-mounted component control module microcontroller that the rail-mounted component is occupied and the restraint deployment signal has been received, the rail-mounted component control module microcontroller communicates the restraint deployment signal to the one or more restraints.

11. A vehicle, comprising:
a rail-mounted component having one or more restraints;
a rail assembly that receives the rail-mounted component such that the rail-mounted component is slidably coupled with the rail assembly;
a high-speed communication network; and
a restraint monitoring system, the restraint monitoring system comprising:
a restraint control module; and
a rail-mounted component control module, wherein the rail-mounted component control module comprises a restraint deployment loop and a restraint diagnostic loop, wherein the high-speed communication network is dedicated to communications between the restraint control module and the rail-mounted component control module, wherein the high-speed communication network is isolated from other communication networks within the vehicle, wherein the restraint control module communicates a restraint deployment signal directly to the rail assembly, wherein the restraint deployment signal is transmitted from the rail assembly to the rail-mounted component control module by way of the high-speed communication network, wherein the restraint deployment signal is received by a rail-mounted component control module microcontroller located on the rail-mounted component, wherein the rail-mounted component control module microcontroller references an occupancy sensor to determine if the rail-mounted component is occupied, wherein upon determination by the rail-mounted component control module microcontroller that the rail-mounted component is occupied and the restraint deployment signal has been received, the rail-mounted component control module microcontroller communicates the restraint deployment signal to the one or more restraints.

12. The vehicle of claim 11, wherein the high-speed communication network is embedded within the rail assembly.

13. The vehicle of claim 11, further comprising:
a vehicle interface module.

14. The vehicle of claim 13, wherein the vehicle interface module comprises:
a vehicle interface module microcontroller that communicates data signals between the rail-mounted component and the vehicle.

15. The vehicle of claim 14, wherein the data signals communicated between the rail-mounted component and the vehicle are at least one signal chosen from a rail-mounted component position within the vehicle, an inventory of monitored components provided on the rail-mounted component, and a status of the monitored components provided on the rail-mounted component.

16. The vehicle of claim 13, wherein the vehicle interface module comprises a regulator module.

17. The vehicle of claim 16, wherein the regulator module is coupled to a vehicle-mounted power supply and the rail assembly.

18. The vehicle of claim 17, wherein the regulator module limits at least one of a voltage and a current that is supplied to the rail assembly by the vehicle-mounted power supply.

19. The vehicle of claim 11, wherein the high-speed communication network is a high-speed CAN bus.

* * * * *